United States Patent
Wang et al.

(10) Patent No.: US 12,243,095 B2
(45) Date of Patent: Mar. 4, 2025

(54) TECHNIQUES FOR GENERATING A THREE DIMENSIONAL MODEL FOR A LISTING

(71) Applicant: eBay Inc., San Jose, CA (US)

(72) Inventors: Qiaosong Wang, Belmont, CA (US); Antonio Haro, Walnut Creek, CA (US); Nitzan Mekel, Purchase, NY (US)

(73) Assignee: eBay Inc., San Jose, CA (US)

( * ) Notice: Subject to any disclaimer, the term of this patent is extended or adjusted under 35 U.S.C. 154(b) by 308 days.

(21) Appl. No.: 17/896,913

(22) Filed: Aug. 26, 2022

(65) Prior Publication Data
US 2024/0070762 A1   Feb. 29, 2024

(51) Int. Cl.
| | | |
|---|---|---|
| *G06T 7/55* | (2017.01) | |
| *G06N 3/082* | (2023.01) | |
| *G06Q 30/0601* | (2023.01) | |
| *G06T 7/70* | (2017.01) | |
| *G06T 15/06* | (2011.01) | |
| *G06T 15/20* | (2011.01) | |

(Continued)

(52) U.S. Cl.
CPC ......... *G06Q 30/0643* (2013.01); *G06N 3/082* (2013.01); *G06T 7/55* (2017.01); *G06T 7/70* (2017.01); *G06T 15/06* (2013.01); *G06T 15/205* (2013.01); *G06T 17/00* (2013.01); *G06T 19/00* (2013.01); *G06V 10/40* (2022.01); *G06V 10/82* (2022.01); *G06V 20/64* (2022.01); *G06T 2207/20084* (2013.01)

(58) Field of Classification Search
None
See application file for complete search history.

(56) References Cited

U.S. PATENT DOCUMENTS

| | | |
|---|---|---|
| 6,329,963 B1 | 12/2001 | Chiabrera et al. |
| 7,010,158 B2 | 3/2006 | Cahill |
| (Continued) | | |

FOREIGN PATENT DOCUMENTS

DE   102021002798 A1   7/2021

OTHER PUBLICATIONS

Mildenhall et al., "Representing Scenes as Neural Radiance Fields for View Synthesis", 2020, URL: https://www.matthewtancik.com/nerf (Year: 2020).*

(Continued)

*Primary Examiner* — David H Chu
(74) *Attorney, Agent, or Firm* — FIG. 1 Patents

(57) ABSTRACT

An application server associated with an online marketplace may receive a set of images of an item, spatial information associated with each image of the set of images indicating a relative spatial location to the item for each image, and viewing direction information indicating a viewing direction relative to the item for each image. The application server may then generate a neural radiance field model of the item in a three dimensional space based on the set of images, the spatial information, and the viewing direction information, and may generate a set of spherical harmonics for the neural radiance field model based on predicting one or more spherical harmonic coefficients using the set of images, the spatial information, and the viewing direction information. The application server may then output a three dimensional model of the item generated based on the set of spherical harmonics.

20 Claims, 16 Drawing Sheets

(51) Int. Cl.
*G06T 17/00* (2006.01)
*G06T 19/00* (2011.01)
*G06V 10/40* (2022.01)
*G06V 10/82* (2022.01)
*G06V 20/64* (2022.01)

(56) References Cited

U.S. PATENT DOCUMENTS

| | | | |
|---|---|---|---|
| 7,633,503 | B2 | 12/2009 | Snyder et al. |
| 7,697,126 | B2 | 4/2010 | Farsaie |
| 9,805,503 | B2 | 10/2017 | Pillai |
| 9,928,544 | B1 | 3/2018 | Hasan |
| 10,699,404 | B1 | 6/2020 | Nussbaum et al. |
| 10,750,075 | B2 | 8/2020 | Glasgow |
| 10,861,225 | B2 | 12/2020 | Boyce et al. |
| 11,182,954 | B2 | 11/2021 | Haramaty et al. |
| 11,205,299 | B2 | 12/2021 | Wang |
| 2009/0006046 | A1 | 1/2009 | Zhou et al. |
| 2013/0135292 | A1 | 5/2013 | Lee et al. |
| 2017/0116755 | A1* | 4/2017 | Imber .................. G06T 7/90 |
| 2019/0035149 | A1* | 1/2019 | Chen ................ G06V 40/166 |
| 2020/0388071 | A1 | 12/2020 | Grabner et al. |
| 2021/0004933 | A1 | 1/2021 | Wong et al. |
| 2021/0136280 | A1 | 5/2021 | Lim et al. |
| 2021/0192762 | A1 | 6/2021 | Guan et al. |
| 2021/0256776 | A1 | 8/2021 | Cappello et al. |
| 2022/0027659 | A1* | 1/2022 | LeGendre ............ H04N 23/611 |
| 2022/0108522 | A1 | 4/2022 | Haramaty et al. |
| 2022/0129974 | A1 | 4/2022 | Delgado et al. |
| 2023/0027890 | A1* | 1/2023 | Zhao .................. G06T 15/04 |
| 2023/0177771 | A1* | 6/2023 | Assarsson ............ G06T 17/20 345/420 |
| 2023/0394740 | A1* | 12/2023 | Kim .................. G06T 15/08 |
| 2024/0029333 | A1* | 1/2024 | Meka ................ G06T 15/506 |
| 2024/0087610 | A1* | 3/2024 | Mann .................. G11B 27/28 |
| 2024/0273811 | A1* | 8/2024 | Radwan ................ G06V 10/82 |

OTHER PUBLICATIONS

Yu et al., "PlenOctrees for Real-time Rendering of Neural Radiance Fields", Mar. 2021, URL: https://openaccess.thecvf.com/content/ICCV2021/papers/Yu_PlenOctrees_for_Real-Time_Rendering_of_Neural_Radiance_Fields_ICCV_2021_paper.pdf (Year: 2021).*

Adelson et al., "The Plenoptic Function and the Elements of Early Vision," Computational Models of Visual Processing (pp. 3-20), Cambridge, MA, MIT Press (1991), 18 pages.

Alibaba Cloud Community, "3D Modeling Techniques for Products Based on Neural Rendering," Dec. 8, 2021, downloaded from URL: https://www.alibabacloud.com/blog/3d-modeling-techniques-for-products-based-on-neural-rendering_598327, 14 pages.

Apple, "Understanding World Tracking | Apple Developer Documentation," downloaded from URL: https://developer.apple.com/documentation/arkit/configuration_objects/understanding_world_tracking, 2022, 3 pages.

Barron et al., "Mip-NeRF: A Multiscale Representation for Anti-Aliasing Neural Radiance Fields," Proceedings of the IEEE/CVF International Conference on Computer Vision 2021, arXiv:2103.13415v1 [cs.CV], Mar. 24, 2021, 19 pages.

Chen et al., "MVSNeRF: Fast Generalizable Radiance Field Reconstruction from Multi-View Stereo," arXiv:2103.15595v1 [cs.CV], Mar. 29, 2021, 13 pages.

Datagen, "Neural Radiance Field (NeRF): A Gentle Introduction," downloaded from https://datagen.tech/guides/synthetic-data/neural-radiance-field-nerf/, 2022, 5 pages.

Hedman et al., "Baking Neural Radiance Fields for Real-Time View Synthesis," arXiv:2103.14645v1 [cs.CV], Mar. 26, 2021, 10 pages.

Kondo et al., "VaxNeRF: Revisiting the Classic for Voxel-Accelerated Neural Radiance Field," arXiv:2111.13112v1 [cs.CV], Nov. 25, 2021, 15 pages.

Kuang et al., "NeROIC: Neural Rendering of Objects from Online Image Collections," arXiv:2201.02533v1 [cs.CV], Jan. 7, 2022, 17 pages.

Levoy et al., "Light Field Rendering," Proceedings of the 23rd Annual Conference on Computer Graphics and Interactive Techniques, 1996, 12 pages.

Mildenhall et al., "Nerf: Representing Scenes as Neural Radiance Fields for View Synthesis," European Conference on Computer Vision, Springer, Cham, arXiv:2003.08934v2 [cs.CV], Aug. 3, 2020, 25 pages.

Reiser et al., "KiloNeRF: Speeding Up Neural Radiance Fields with Thousands of Tiny MLPs," arXiv:2103.13744v2 [cs.CV], Aug. 2, 2021, 11 pages.

Rückert et al., "ADOP: Approximate Differentiable One-Pixel Point Rendering," arXiv:2110.06635v3 [cs.CV], May 3, 2022, 14 pages.

Wizadwongsa et al., "NeX: Real-time View Synthesis with Neural Basis Expansion," arXiv:2103.05606v1 [cs.CV], Mar. 9, 2021, 10 pages.

Wu et al., "DIVeR: Real-time and Accurate Neural Radiance Fields with Deterministic Integration for Volume Rendering," arXiv:2111.10427v1 [cs.CV], Nov. 19, 2021, 10 pages.

Yu et al., "PlenOctrees for Real-time Rendering of Neural Radiance Fields," arXiv:2103.14024v2 [cs.CV], Aug. 17, 2021, 18 pages.

Zhang et al., "Ray Priors through Reprojection: Improving Neural Radiance Fields for Novel View Extrapolation," arXiv:2205.05922v1 [cs.CV], May 12, 2022, 11 pages.

* cited by examiner

TECHNIQUES FOR GENERATING A THREE DIMENSIONAL MODEL FOR A LISTING

FIELD OF TECHNOLOGY

The present disclosure relates generally to database systems and data processing, and more specifically to techniques for generating a three dimensional model for a listing.

BACKGROUND

Computer networks permit the transport of data between interconnected computers. Search engine technology permits a user to obtain information from a vast array of sources available via a computer network. A search engine may be a program that searches for and identifies content in a database that correspond to keywords or characters input by the user, and may return websites available via the Internet based on the search. Often times, online marketplaces provide for a seller creating a listing for a product. Then, a buyer may search for a product using a search query. To generate a search, a user may interact with a user device, such as a computer or mobile phone, to submit a search query via a search engine. The search engine may execute the search and display results for the search query based on communication with other applications and servers. In online marketplaces, user interest in a listing may be generated or increased based on the quality of listings. In particular, interactive three dimensional models of products may enhance a buying experience. Techniques for listing generation using three dimensional models may be improved.

SUMMARY

A method for generating a listing for an item is described. The method may include receiving a set of multiple images of an item, spatial information associated with each image of the set of multiple images indicating a relative spatial location to the item for each image of the set of multiple images, and viewing direction information indicating a viewing direction relative to the item for each image of the set of multiple images, generating a neural radiance field model of the item in a three dimensional space based on the set of multiple images, the spatial information, and the viewing direction information, generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space, and outputting a three dimensional model of the item generated based on the set of multiple spherical harmonics.

An apparatus for generating a listing for an item is described. The apparatus may include a processor, memory coupled with the processor, and instructions stored in the memory. The instructions may be executable by the processor to cause the apparatus to receive a set of multiple images of an item, spatial information associated with each image of the set of multiple images indicating a relative spatial location to the item for each image of the set of multiple images, and viewing direction information indicating a viewing direction relative to the item for each image of the set of multiple images, generate a neural radiance field model of the item in a three dimensional space based on the set of multiple images, the spatial information, and the viewing direction information, generate a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space, and output a three dimensional model of the item generated based on the set of multiple spherical harmonics.

Another apparatus for generating a listing for an item is described. The apparatus may include means for receiving a set of multiple images of an item, spatial information associated with each image of the set of multiple images indicating a relative spatial location to the item for each image of the set of multiple images, and viewing direction information indicating a viewing direction relative to the item for each image of the set of multiple images, means for generating a neural radiance field model of the item in a three dimensional space based on the set of multiple images, the spatial information, and the viewing direction information, means for generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space, and means for outputting a three dimensional model of the item generated based on the set of multiple spherical harmonics.

A non-transitory computer-readable medium storing code for generating a listing for an item is described. The code may include instructions executable by a processor to receive a set of multiple images of an item, spatial information associated with each image of the set of multiple images indicating a relative spatial location to the item for each image of the set of multiple images, and viewing direction information indicating a viewing direction relative to the item for each image of the set of multiple images, generate a neural radiance field model of the item in a three dimensional space based on the set of multiple images, the spatial information, and the viewing direction information, generate a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space, and output a three dimensional model of the item generated based on the set of multiple spherical harmonics.

Some examples of the method, apparatuses, and non-transitory computer-readable medium described herein may further include operations, features, means, or instructions for generating, based on the spatial information (e.g., five dimensional spatial information), the neural radiance field model that indicates a volume density and an emitted radiance associated with the item at a set of multiple three dimensional points within the three dimensional space.

In some examples of the method, apparatuses, and non-transitory computer-readable medium described herein, generating the neural radiance field model may include operations, features, means, or instructions for generating a later iteration of the neural radiance field model based on removing one or more weights from a prior iteration of the neural radiance field model that do not satisfy an activation criterion.

In some examples of the method, apparatuses, and non-transitory computer-readable medium described herein, generating the neural radiance field model may include operations, features, means, or instructions for generating the neural radiance field model based on casting a cone for each pixel of each image of the set of multiple images, where the cone may be cast into a series of conical frustums.

In some examples of the method, apparatuses, and non-transitory computer-readable medium described herein, generating the neural radiance field model may include operations, features, means, or instructions for determining that multiple images of the set of multiple images depict the item at a defined three dimensional point in the three dimensional space and adjusting a color value of the item corresponding to the defined three dimensional point in one or more of the multiple images with a statistical value for the color value at the defined three dimensional point determined from the set of multiple images.

Some examples of the method, apparatuses, and non-transitory computer-readable medium described herein may further include operations, features, means, or instructions for calculating a color value for the item at a three dimensional point in the three dimensional space based on a function of the one or more spherical harmonic coefficients associated with the item that may be evaluated at corresponding ray directions associated with the three dimensional point.

In some examples of the method, apparatuses, and non-transitory computer-readable medium described herein, sampling the neural radiance field model into a tabulated view-dependent volume, where outputting the three dimensional model of the item generated may be based on sampling the neural radiance field model.

DETAILED DESCRIPTION

Figure 1:
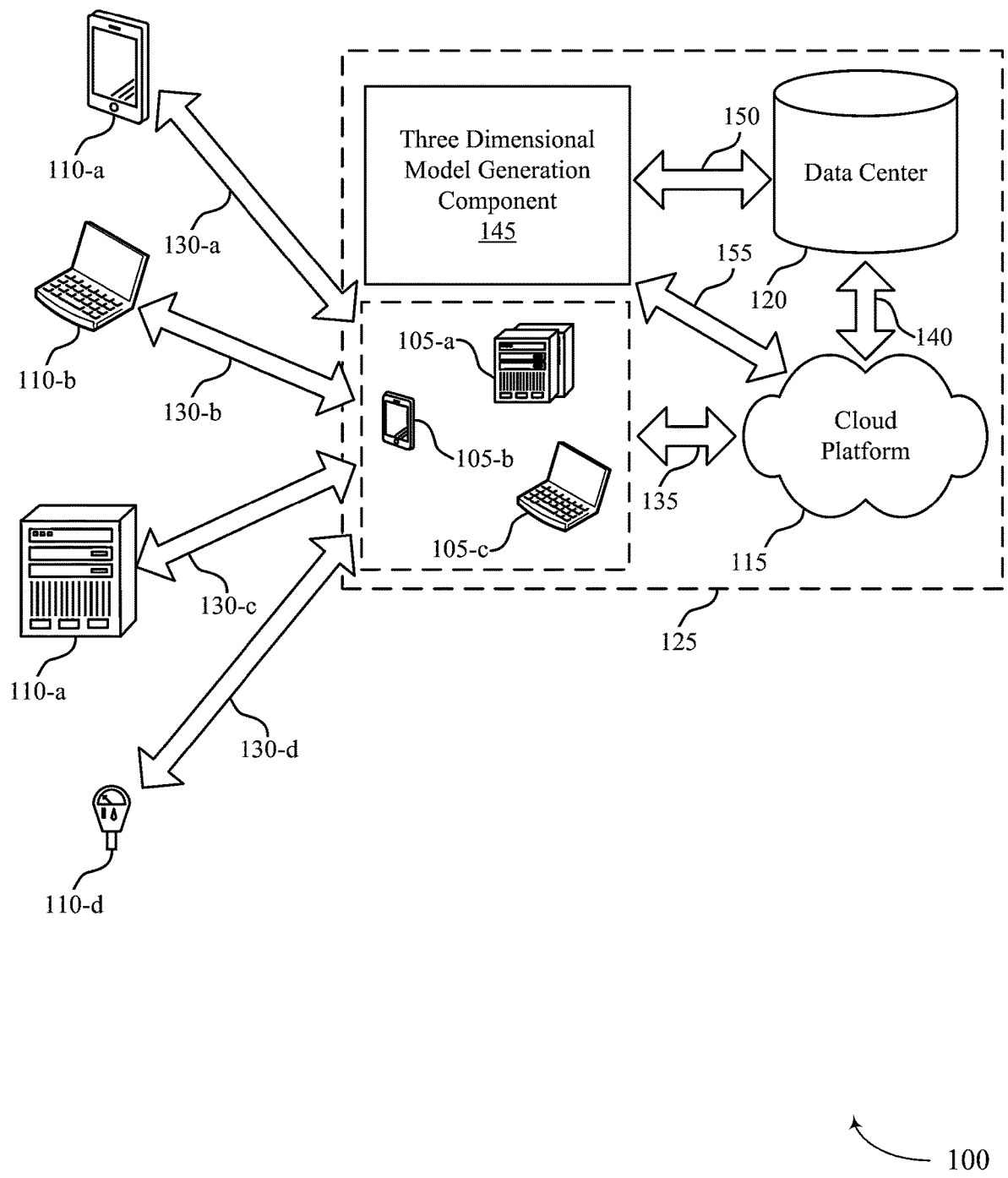
FIG. 1 illustrates an example of a method for generating a listing for an item system that supports techniques for generating a three dimensional model for a listing in accordance with aspects of the present disclosure.

In online marketplaces, user interest in a listing may be generated or increased based on the quality of listings. In particular, capturing interactive three dimensional scenes or objects could boost user experience and sales conversion. In a three dimensional model generation, a three dimensional model of a listing (e.g., a rotation three dimensional model of an object included in a listing) may replace or otherwise supplement one or more images included in a listing. In order to efficiently capture a three dimensional image, in some examples, human modelers may clean up or touch-up the three dimensional model prior to deploying such models as listings. Also some techniques for three dimensional model generation may be based on photogrammetry which may not capture textureless or transparent or thin-structure objects. In contrast, the techniques depicted herein leverage neural radiance fields to generate a three dimensional listing. In particular, one or more aspects of the present disclosure provide for capturing light rays rather than the mesh or surface of a three dimensional object.

The techniques described herein provide for a process of capturing one or more two dimensional images, processing the two dimensional images, and generating a three dimensional model from the two dimensional images. For example, the techniques depicted herein provide for three dimensional model generation in listing an item in an online marketplace. For the capturing one or more images, a user may use a software application in a user device. The application may guide the user to use a consumer mobile phone to capture a series of images (e.g., two dimensional images) around an object of a product for creating a listing. The application may recognize notable features in a set of images and may track differences in the positions of those features across image or video frames. The application may further compare that information with motion sensing data. The result of such comparison may be a high-precision model of the device's position and motion. The application from a user device may then send the set of captured images for processing at a server of an online marketplace.

For processing the set of images, the system (e.g., a server of the online marketplace) may apply a set of neural network algorithms in succession. The system may apply a neural radiance field model on the set of images. By using the neural radiance field, the system may synthesize novel views of complex scenes by optimizing an underlying continuous volumetric scene function using a sparse set of input views. The neural radiance field algorithm may represent a scene using a fully-connected (non-convolutional) deep network, whose input may be or may include a single continuous five dimensional coordinate (spatial location (x, y, z) and viewing direction ($\theta$, $\phi$)) and whose output is the volume density and view-dependent emitted radiance at that spatial location. After applying the neural radiance field model on the input set of images, the system may generate spherical harmonics for the neural radiance field model. Finally, the system may render a three dimensional scene (e.g., in a web browser in real-time), so that a user can interact with the model when browsing for a listing.

Aspects of the disclosure are initially described in the context of an environment supporting an on-demand database service. Aspects of the disclosure may further describe one or more block diagrams describing one or more algorithms. Aspects of the disclosure are further illustrated by and described with reference to apparatus diagrams, system diagrams, and flowcharts that relate to techniques for generating a three dimensional model for a listing.

FIG. 1 illustrates an example of a system 100 for cloud computing that supports techniques for generating a three dimensional model for a listing in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be part of a business, an enterprise, a non-profit, a startup, or any other organization type.

A cloud client 105 may facilitate communication between the data center 120 and one or multiple user devices 110 to implement an online marketplace. The network connection 130 may include communications, opportunities, purchases, sales, or any other interaction between a cloud client 105 and a user device 110. A cloud client 105 may access cloud platform 115 to store, manage, and process the data communicated via one or more network connections 130. In some cases, the cloud client 105 may have an associated security or permission level. A cloud client 105 may have access to some applications, data, and database information within cloud platform 115 based on the associated security or permission level, and may not have access to others.

The user device 110 may interact with the cloud client 105 over network connection 130. The network may implement transfer control protocol and internet protocol (TCP/IP), such as the Internet, or may implement other network protocols. The network connection 130 may facilitate transport of data via email, web, text messages, mail, or any other appropriate form of electronic interaction (e.g., network connections 130-a, 130-b, 130-c, and 130-d) via a computer network. In an example, the user device 110 may be computing device such as a smartphone 110-a, a laptop 110-b, and also may be a server 110-c or a sensor 110-d. In other cases, the user device 110 may be another computing system. In some cases, the user device 110 may be operated by a user or group of users. The user or group of users may be a customer, associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support an online application. This may include support for sales between buyers and sellers operating user devices 110, service, marketing of products posted by buyers, community interactions between buyers and sellers, analytics, such as user-interaction metrics, applications (e.g., computer vision and machine learning), and the Internet of Things. Cloud platform 115 may receive data associated with generation of an online marketplace from the cloud client 105 over network connection 135, and may store and analyze the data. In some cases, cloud platform 115 may receive data directly from a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or via network connection 130 between a user device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, three dimensional model generation component 145, and data center 120 that may coordinate with cloud platform 115 and data center 120 to implement an online marketplace. In some cases, data processing may occur at any of the components of server system 125, or at a combination of these components. In some cases, servers may perform the data processing. The servers may be a cloud client 105 or located at data center 120.

The three dimensional model generation component 145 may communicate with cloud platform 115 via connection 155, and may also communicate with data center 120 via connection 150. The three dimensional model generation component 145 may receive signals and inputs from user device 110 via cloud clients 105 and via cloud platform 115 or data center 120.

Online marketplaces enable sellers to present items for selling to potential buyers. The details describing each item on sale are commonly organized in a dedicated page, known as the listing page. A listing page may include information such as the item title, price, shipping details, image and various attributes, such as color, model, size, etc. Such information is collected from the seller using a digital form. For some listings, a seller may upload many two dimensional images of the product to be listed. Some systems may implement an online marketplace where a listing is displayed using a seller inputted image. Often times, the image provided by a seller includes a dimly lit image or an image that does not describe all aspects of the item or provides a view of the entire item. In some cases, sellers and buyers may interact with such an online marketplace using a mobile device via a software applications. Specifically, sellers may list a product using the software application. The seller may utilize a user device to generate the listing. However, it may be challenging for the seller to enhance the quality of images in a listing. Thus, efficient listing techniques may be desired.

The techniques depicted herein provide for rendering a three dimensional model based on receiving a set of two dimensional images. According to one or more aspects depicted herein, the system 100 implements procedures and techniques for generating a listing of an item where the listing includes a three dimensional model generated from a set of two dimensional images uploaded by a seller. Specifically, server system 125 may include operations similar to those as described herein. One or more components of server system 125, including three dimensional model generation component 145, as described herein, may operate to generate a listing for a product.

The three dimensional model generation component 145 within server system 125 may receive a set of images of an item, spatial information associated with each image of the set of images indicating a relative spatial location to the item for each image, and viewing direction information indicating a viewing direction relative to the item for each image. The three dimensional model generation component 145 may then generate a neural radiance field model of the item in a three dimensional space based on the set of images, the spatial information, and the viewing direction information, and may generate a set of spherical harmonics for the neural radiance field model based on predicting one or more spherical harmonic coefficients using the set of images, the spatial information, and the viewing direction information. The three dimensional model generation component 145 may then output a three dimensional model of the item generated based on the set of spherical harmonics. The three dimensional model may be linked to an item listing available via an online marketplace that performs a prospective buyer to view and rotate the item in multiple directions when making a purchasing decision.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings include example technical improvements resulting from implementing aspects of the disclosure, and accordingly do not represent all of the technical improvements provided within the scope of the claims.

Figure 2:
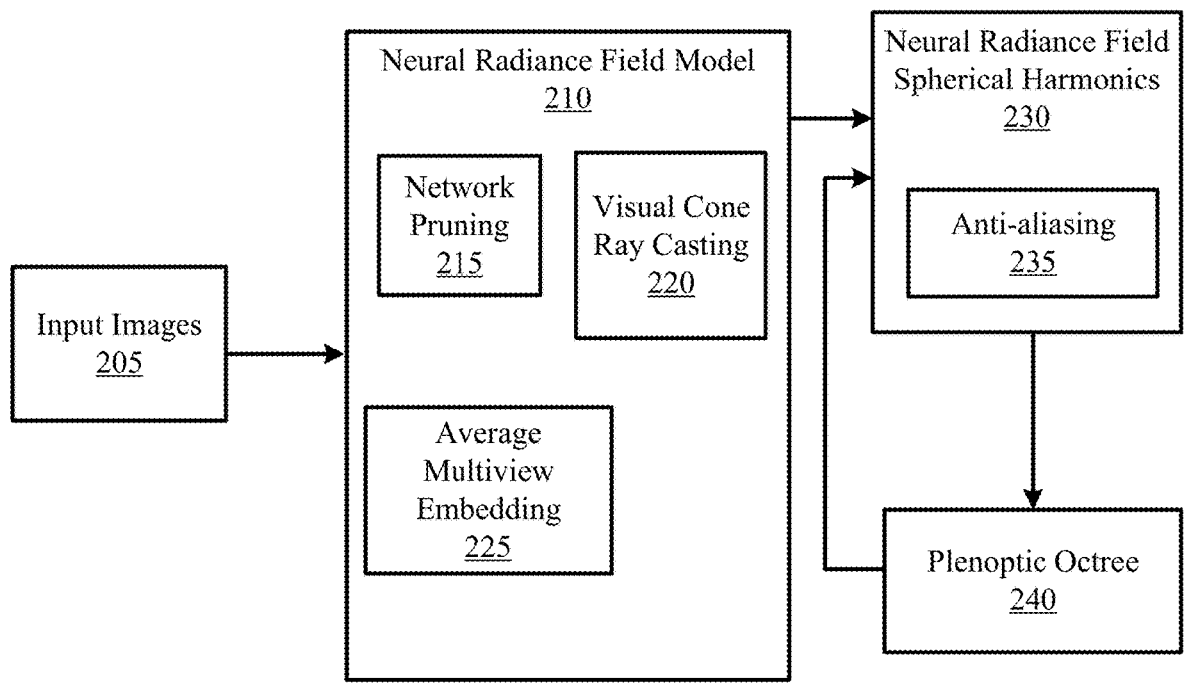
FIG. 2 illustrates an example of a block diagram that supports techniques for generating a three dimensional model for a listing in accordance with aspects of the present disclosure.

FIG. 2 illustrates an example of a block diagram 200 that supports techniques for generating a three dimensional model for a listing in accordance with aspects of the present disclosure. A system including an online marketplace server may utilize the block diagram 200 to generate a three dimensional model of an item for a listing in an online marketplace. In some examples, the three dimensional model generation component 145, as described with reference to FIG. 1, may include components of the block diagram 200. A seller, via a user device 110, may use an image capturing application to capture a set of images of an item. Such an image capturing may be for generation of the listing.

The seller, via a camera of user device 110, may capture one or more two dimensional images using a kit. The techniques of the present disclosure may utilize the block diagram 200 (e.g., the three dimensional model generation component 145, as described with reference to FIG. 1) for processing the two dimensional images and may generate a three dimensional model from the two dimensional images. The seller or any other user may utilize one or more directions provided by an application to capture a set of two dimensional images. For the capturing of the set of two dimensional images, a user may use an application in a user device. The application may guide the user to use a consumer mobile phone (e.g., user device 110) to capture a series of images by moving around an object (e.g., item for listing) from various different directions. In some examples, the application installed on a user device 110 may receive the camera poses using a visual-inertial odometry technique. This process may combine information from the user device's motion sensing hardware with computer vision analysis of the scene visible to the device's camera. In some examples, the application on the user device may recognize notable features in the scene image (in a set of images captured by the camera of the user device). The application may track differences in the positions of those features across image or video frames, and compare that information with motion sensing data. The result generated by the application may be a high-precision model of the device's position and motion. The application from a user device may then send the set of captured images for processing at a server (e.g., three dimensional model generation component 145 within server system 125 as described with reference to FIG. 1) of an online marketplace. The server may receive the set of input images 205 captured at the user device. Such input images 205 may include images of a product (or item for creating a listing) captured from various angles as directed by the application in the user device.

The server may receive a set of images 205 of an item from an application installed in a user device. A user may utilize a camera (e.g., a camera included in a user device) to capture a set of image and the server may analyze each image to identify spatial information (e.g., location information in space) for each of the images. Additionally or alternatively, the server may receive, from the user device, spatial and directional information associated with the set of images included in metadata for each image. The server may receive spatial information associated with each image of the set of images 205 indicating a relative spatial location to the item for each image of the set of images. The server may also receive viewing direction information indicating a viewing direction relative to the item for each image of the set of images 205. The spatial information associated with each image of the set of images 205 may include a five dimensional spatial information that indicates three dimensional coordinates in the three dimensional space and the viewing direction including a two dimensional viewing direction associated with each image of the set of images 205. For processing the photos along with the camera poses (spatial information and viewing direction information obtained through the application at the user device), the server may use a deep neural network to learn the underlying scene structure and radiance field. The neural network may be trained to generate synthetic images at any given angle and to reduce the error between the synthetic and real input images. For processing the set of images, the system may apply a set of neural network algorithms in succession according to the pattern depicted in FIG. 2.

Upon receiving the set of images 205, the server may generate a neural radiance field model 210. In particular, the server may generate a neural radiance field model 210 of the item in a three dimensional space based on the set of images 205 depicting the item, the spatial information, and the viewing direction information. The server may apply the neural radiance field model 210 on the set of images 205 to synthesize novel views of complex scenes by optimizing an underlying continuous volumetric scene function using a sparse set of input views. As depicted in the example of FIG. 2, the neural radiance field model 210 may include a network pruning operation 215 further described with reference to FIG. 3, a visual cone ray casting operation 220 further described with reference to FIG. 4, and an average multi-view embedding operation 225 further described with reference to FIG. 5.

The neural radiance field algorithm associated with the neural radiance field model 210 may represent a scene using a fully-connected (non-convolutional) deep network, whose input may include a single continuous five dimensional coordinate (spatial location in a Cartesian coordinate system (x, y, z) and viewing direction (0, (p)) and whose output may include a volume density and view-dependent emitted radiance at that spatial location. Spatial location of a product in accordance to a Cartesian coordinate system (x, y, z) may refer to a location of the product in x-axis, y-axis and z-axis. The viewing direction (0, (p) may refer to azimuthal angle and a polar angle of the product from the camera used to capture the image of the product. The neural radiance field algorithm may synthesize multiple views by querying five dimensional coordinates along camera rays and using volume rendering techniques to project the output radiance values into an image. A radiance value refer to an intensity of radiant flux emitted, reflected, transmitted or received by a given surface, per unit solid angle per unit projected area, and may correspond to a color of a particular voxel in a three dimensional space. In some examples, a neural radiance field algorithm may represent a scene using a fully-connected (non-convolutional) deep network, whose input is a single continuous five dimensional coordinate (spatial location (x, y, z) and viewing direction (0, (p)) and whose output is the volume density and view-dependent emitted radiance at that spatial location.

A neural radiance field algorithm may be trained to map directly from viewing direction and spatial location (five dimensional input) to opacity and color (4D output), using volume rendering to render new views. Thus, the neural radiance field algorithm may use a sparse set of input views to generate a continuous volumetric scene function. As a result, the neural radiance field algorithm may produce novel views of a complex scene by outputting an emitted color c=(r; g; b) and a volume density (a) in response to inputting a set of sample points. The server (e.g., three dimensional model generation component 145 within server system 125 as described with reference to FIG. 1) may utilize the techniques depicted herein to translate pixels from the set of input image to voxels in a 3D space. For a given camera position, the techniques depicted herein may provide for a volume rendering technique to obtain the RGB (Red, Green, Blue) for every voxel in the 3D space through which rays from the camera are casted. The techniques depicted herein may then record the RGB color for each corresponding pixel of the two dimensional image. The process is repeated for every pixel in each image until the set of two dimensional images generates a three dimensional model of the object in 3D space.

As depicted in the example of FIG. 2, the neural radiance field model 210 may include a network pruning operation 215, a visual cone ray casting operation 220 and an average multi-view embedding operation 225. The network pruning operation 215 may include a method of compression that involves removing weights from a trained model (e.g., neural radiance field model 210). The server may train the neural radiance field model 210 in an iterative manner. For example, for each iteration, the server may remove some weights used to train the neural radiance field model 210. For example, as part on the network pruning operation 215, the server may generate a later iteration of the neural radiance field model 210 based on removing one or more weights from a prior iteration of the neural radiance field model 210 that do not satisfy an activation criterion.

In the visual cone ray casting operation 220, the server may cast a cone from each pixel. Instead of performing point-sampling along each ray, the server may divide the cone being cast into a series of conical frustums. For instance, the server may generate the neural radiance field model based on casting a cone for each pixel of each image of the set of images 205. In some examples, the cone may be cast into a series of conical frustums. For the average multi-view embedding operation 225, for each three dimensional point (in the two dimensional images), the server may calculate a list of visible camera frames (if the three dimensional point's projection is within that frame, then that frame is added to the list of visible frames). Then, the server may apply a learnt embedding of that point to be the same across the list of visible frames by replacing the embedding of each individual frame to be the averaged value of embeddings across all frames. For example, the server may determine that multiple images of the set of images 205 depict the item at a defined three dimensional point in the three dimensional space. The server may then adjust a color value of the item corresponding to the defined three dimensional point in one or more of the multiple images with a statistical value for the color value (e.g., average color value) at the defined three dimensional point determined from the set of images 205.

After applying the neural radiance field model 210 on the input set of images 205, the system may generate a set of spherical harmonics for the neural radiance field model 210. The neural radiance field spherical harmonics 230 may use an optimization procedure and a volume rendering method. However, instead of predicting a red-green-blue (RGB) color c directly, the server (e.g., three dimensional model generation component 145 within server system 125 as described with reference to FIG. 1) may predict a set of one or more spherical harmonic coefficients k for each three dimensional point (e.g., a voxel) in a three dimensional space. The server may then calculate a color c for a voxel by summing the weighted spherical harmonic bases evaluated at the corresponding ray direction (0, (p) and corresponding to a particular three dimensional point in a three dimensional space. For instance, the server may calculate a color value for the item (e.g., product for listing) at a three dimensional point in the three dimensional space based on a function of the one or more spherical harmonic coefficients associated with the item that are evaluated at corresponding ray directions associated with the three dimensional point, which may be obtained from one or more of the input images. The spherical harmonics may thus enable the representation to model view-dependent appearance.

The server may perform a conversion process from the neural radiance field model 210 to neural radiance field spherical harmonics 230. In some examples, the server may evaluate the input images on a grid, retaining volume density values, then filtering the voxels via thresholding. In some examples, the server may sample random points (e.g., presample) within each remaining voxel and average the sampled, random points, to obtain spherical harmonics coefficients to store in the octree leaves. In addition, the server may perform an anti-aliasing operation 235 reduce an effect in which the sampling frequency is too low to accurately reproduce the original content, resulting in pixelated artifacts in the image. The server may determine a PlenOptic octree 240 by pre-sampling the neural radiance field model into a tabulated view-dependent volume.

In some examples, the server may output the three dimensional model of the item based on pre-sampling the neural radiance field model 210. In accordance with the block diagram 200 depicted in FIG. 2, the server may render the three dimensional scene in a web browser in real-time, so that a user (a seller or a buyer) can interact with the three dimensional model.

Figure 3:
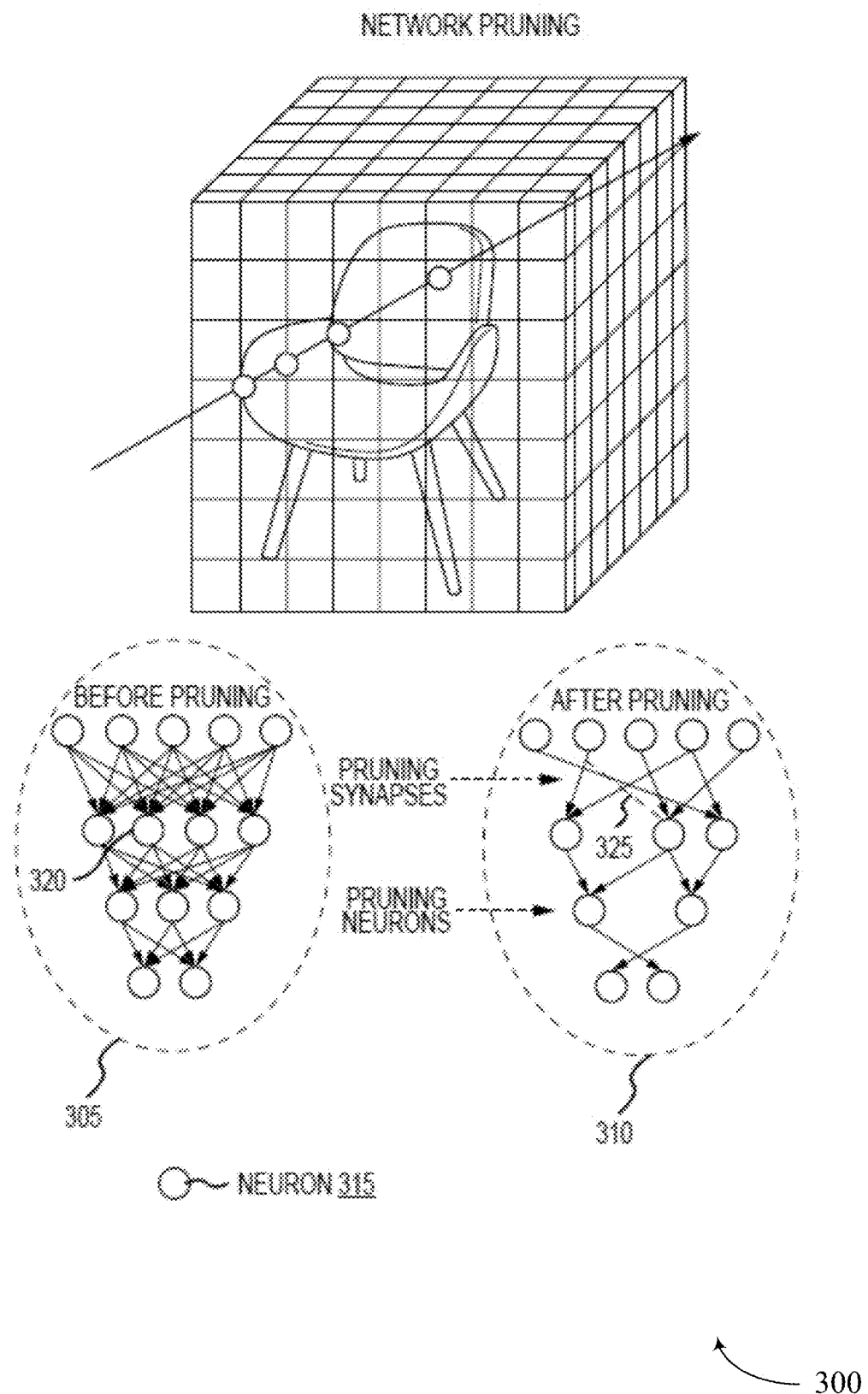
FIG. 3 illustrates an example of a network pruning operation that supports techniques for generating a three dimensional model for a listing in accordance with aspects of the present disclosure.

FIG. 3 illustrates an example of a network pruning operation 300 that supports techniques for generating a three dimensional model for a listing in accordance with aspects of the present disclosure. According to aspects depicted herein, a user (e.g., a seller of an online marketplace) may use the techniques depicted herein to generate a three dimensional model of an item by inputting a set of two dimensional images. In some examples, the user may use an application in a user device to capture a set of images from multiple directions of the item. For instance, the user may change the camera angle for each image (as directed by the application). In some examples, the application may direct the user to stop taking images once the application determines that enough images have been captured. Alternatively, the application may provide instructions to the user to change a camera angle or angle of the item to gather additional images showing different angles of the item.

As depicted with reference to FIG. 2, the application on the user device may transmit the set of images to a server (e.g., three dimensional model generation component 145 within server system 125 as described with reference to FIG. 1) of the online marketplace. In some examples, the server may generate a neural radiance field model of the item in a three dimensional space based on the set of input images, spatial information for each image, and viewing direction information for each image. The neural radiance field may include a method for synthesizing novel views of complex scenes by optimizing an underlying continuous volumetric scene function using a sparse set of input views. The neural radiance field algorithm may represent a scene using a fully-connected (non-convolutional) deep network, whose input includes the spatial location (x, y, z) and the viewing direction (0, (p)). The output of the deep network may be a volume density and view-dependent emitted radiance at that spatial location. View-dependent emitted radiance may refer to radiant flux emitted, reflected, transmitted or received by a given surface, per unit solid angle per unit projected area, and may correspond to a color of a particular voxel from a particular viewing direction. Volume density may refer to an intensity of a color from a particular viewing direction.

According to aspects depicted herein, the server may generate the neural radiance field model of the item using the network pruning operation 300 as depicted in the example of FIG. 3. The network pruning operation 300 may perform a compression of the neural radiance field model. In particular, model compression aims to reduce the size of models while reducing (e.g., minimizing) loss in accuracy or performance. The network pruning operation 300 may include a method of compression that involves removing weights from a trained model (neural radiance field model). For example, the network pruning operation 300 may remove unnecessary neurons 315 or weights. According to aspects depicted herein, the server may prune the weights for the neural radiance field model by pruning (or removing) neurons 315 learning empty space in a three dimensional space. Stated differently, the weights for the neural radiance field model that project output color (e.g., view-dependent emitted radiance) and volume density into the 3D model of the object that is empty (e.g., a voxel with no color or very faint color), may be pruned. In an example, the neural radiance field model may first generate a neural network architecture 305 including a set of neurons 315. The neural radiance field model may evaluate a weight (or value) for each neuron 315, and may determine whether to include the neuron in the pruned neural network architecture 310. If the neural radiance field model is trained without using that neuron (rarely activates with a high value), then the server may prune that neuron (e.g., neuron 320 is removed from the neural network architecture 310).

In some examples, there may be different ways to prune a neural network. The server may set individual parameters to zero and make the network sparse. This would lower the number of parameters in the model while keeping the architecture the same. Alternatively, or additionally, the server may remove entire nodes from the network, making the network architecture smaller, while aiming to keep the accuracy of the initial larger network. In some instances, the server may generate a later iteration of the neural radiance field model based on removing one or more weights from a prior iteration of the neural radiance field model that do not satisfy an activation criterion. As depicted in the example of FIG. 3, the server may start with the neural network architecture 305 (prior to pruning). The neural network architecture 305 may include a set of neurons 320. After pruning, the server may generate the neural network architecture 310 including the pruned neurons. In some examples, the server may identify the weights for removal based on a set of heuristics and methods of determining which nodes are less important and can be removed with minimal effect on accuracy. Such heuristics may be based on the weights or activations of a neuron to determine how important it is for the model's performance. In some examples, the server may perform the network pruning operation 300 by pruning based on a magnitude of the weight. As the server implements removing a weight by setting it to zero, the server may reduce or minimize the effect on the network by removing weights that are already close to zero, meaning low in magnitude (or less than a threshold value). In addition, the server may reduce (or prune) a number of synapses when generating the neural network architecture 310. For instance, in the neural network architecture 310, the synapse 325 may be removed. In some cases, the server may identify synapses that are redundant or are associated with removed neurons.

Figure 4:
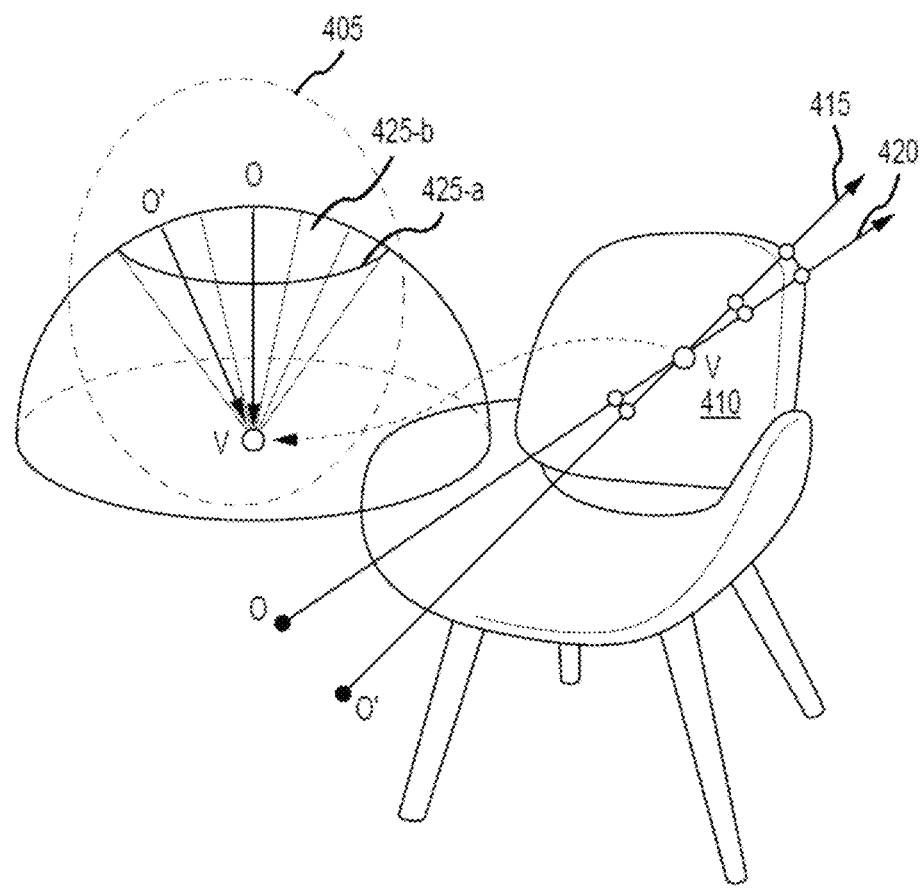
FIG. 4 illustrates an example of a visual cone ray casting operation that supports techniques for generating a three dimensional model for a listing in accordance with aspects of the present disclosure.

FIG. 4 illustrates an example of a visual cone ray casting operation 400 that supports techniques for generating a three dimensional model for a listing in accordance with aspects of the present disclosure. According to aspects depicted herein, a user (e.g., a seller of an online marketplace) may use the techniques depicted herein to generate a three dimensional model of an item by inputting a set of two dimensional images. The application may transmit the set of input images to a server (e.g., three dimensional model generation component 145 within server system 125 as described with reference to FIG. 1) of the online marketplace. The server may apply a set of operations (as depicted with reference to FIG. 2) to render a three dimensional model. The server may first generate a neural radiance field model based on receiving the set of images.

As depicted with reference to FIG. 2, the neural radiance field model generation may include a network pruning operation 300 as described with reference to FIG. 3, a visual cone ray casting operation 400 as described with reference to FIG. 4, and an average multi-view embedding operation 500 as described with reference to FIG. 5. In the visual cone ray casting operation 400, the server may generate the neural radiance field model based on casting a cone for each pixel of each image of the set of images (e.g., set of input images). As depicted in the example of FIG. 4, the visual cone ray casting operation 400 may include casting a cone 405 for a pixel 410. In some examples, the cone may be cast into a series of conical frustums.

In some examples, the neural radiance field model generation may involve a point sampling method. However, the point-sampling may make the neural radiance field vulnerable to issues related to sampling and aliasing. Through a pixel's color is the integration of all incoming radiance within the pixel's frustum, the neural radiance field may cast a single infinitesimally narrow ray (e.g., ray 415 and ray 420) per pixel 410, resulting in aliasing. The visual cone ray casting operation 400 may ameliorate this issue by casting a cone 405 from each pixel 410. Instead of performing point-sampling along each ray (e.g., ray 415 and ray 420), the visual cone ray casting operation 400 may divide the cone 405 being cast into a series of conical frustums. As depicted in the example of FIG. 4, the cone 405 may be divided in conical frustums 425 (e.g., conical frustum 425-a and conical frustum 425-b). These changes allow the neural radiance field to learn about the size and shape of each conical frustum, instead of just its centroid. The neural radiance field model may then use the visual cone ray casting to determine a color (e.g., emitted radiance) and density of each pixel in each image, for translation to voxels in the 3D space.

Figure 5:
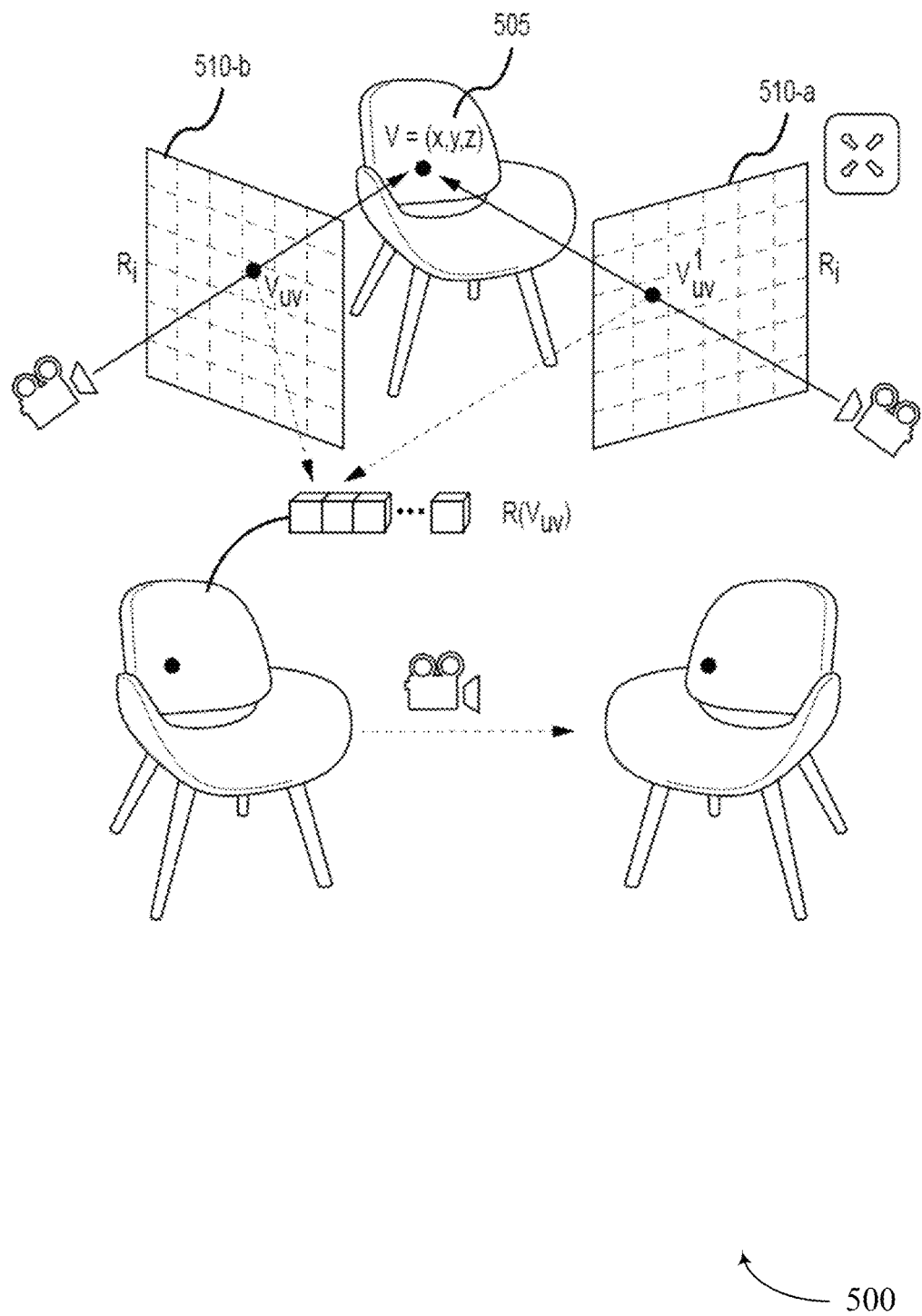
FIG. 5 illustrates an example of a multi-view embedding operation that supports techniques for generating a three dimensional model for a listing in accordance with aspects of the present disclosure.

FIG. 5 illustrates an example of a multi-view embedding operation 500 that supports techniques for generating a three dimensional model for a listing in accordance with aspects of the present disclosure. A server (e.g., three dimensional model generation component 145 within server system 125 as described with reference to FIG. 1) may receive a set of images from a user device. The set of images may include a set of images of an item captured from multiple angles and multiple viewing direction.

As depicted with reference to FIG. 2, the neural radiance field model generation may include a network pruning operation 300 as described with reference to FIG. 3, a visual cone ray casting operation 400 as described with reference to FIG. 4, and a multi-view embedding operation 500 (e.g., an average multi-view embedding operation) as described with reference to FIG. 5. Upon receiving the set of images, the server may perform the multi-view embedding operation 500 for each three dimensional point 505. The server may analyze the set of images to identify a set of three dimensional points. For each three dimensional point 505 (e.g., corresponding to a voxel), the server may calculate a list of visible camera frames (e.g., camera frame 510-a and camera frame 510-b) that includes the same three dimensional point 505. If the three dimensional point's projection is within that frame, then the server may add that frame is added to the list of visible frames. The server may then designate the learnt embedding of that point 505 to be the same across the list of visible frames by replacing the embedding of each individual frame to be a function of a color value of embeddings across multiple or all frames (e.g., an averaged color value). For instance, the server may analyze the set of images to determine that multiple images of the set of input images depict the item at a defined three dimensional point 505 in the three dimensional space. The server may then adjust a color value of the item corresponding to the defined three dimensional point 505 in one or more of the multiple images with a statistical value (e.g., average value) for the color value at the defined three dimensional point 505 determined from the set of images. Thus, the average multi-view embedding operation 500 provides for a multi-view consistency of a three dimensional point 505 in a 3D space, such that when the user is switching views or changing viewpoints, the color of that three dimensional point remains unchanged or relatively unchanged.

Figure 6:
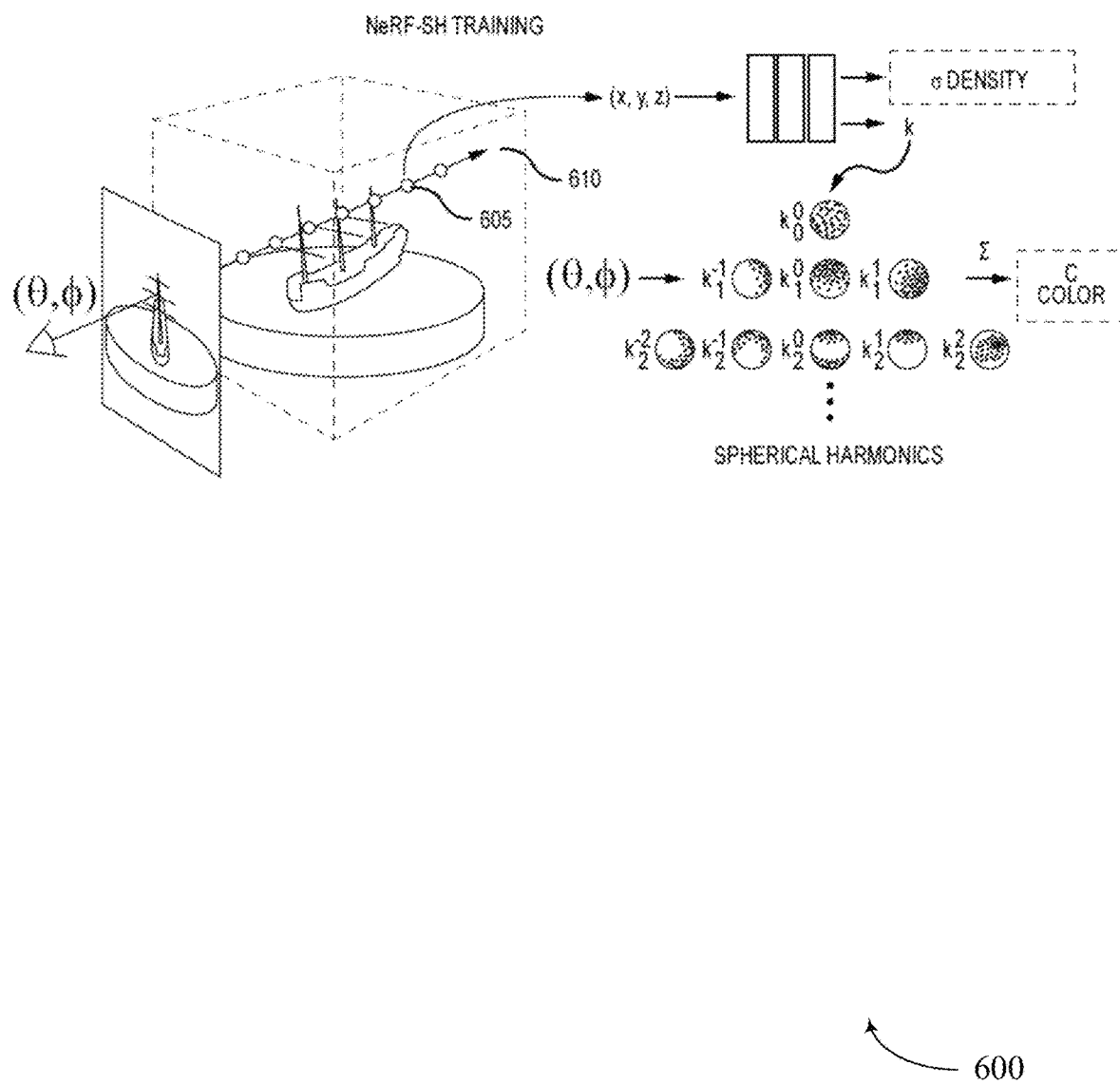
FIG. 6 illustrates an example of a neural radiance field spherical harmonics model that supports techniques for generating a three dimensional model for a listing in accordance with aspects of the present disclosure.

FIG. 6 illustrates an example of a neural radiance field spherical harmonics model 600 that supports techniques for generating a three dimensional model for a listing in accordance with aspects of the present disclosure. As depicted with reference to FIGS. 2 through 5, a user (e.g., seller) may capture a set of images of an item from multiple angles using an application in a user device. The user may transmit the set of images to a server associated with the online marketplace. The set of images may include a set of images of an item captured from multiple angles and multiple viewing directions.

The server may receive the set of images of an item, spatial information associated with each image of the set of images indicating a relative spatial location to the item for each image of the set of images, and viewing direction information indicating a viewing direction relative to the item for each image of the set of images. In some examples, the spatial information associated with each image of the set of images may be five dimensional spatial information that indicates three dimensional coordinates in the three dimensional space and the viewing direction including a two dimensional viewing direction associated with each image of the set of images. The server may generate a neural radiance field model of the item in a three dimensional space based on the set of images, the spatial information, and the viewing direction information.

In some examples, the server may generate a set of spherical harmonics for the neural radiance field model based on predicting one or more spherical harmonic coefficients using the set of images, the spatial information, and the viewing direction information. In some examples, the set of spherical harmonics may indicate a set of radiance values each being associated with a respective three dimensional point (e.g., x, y, z) in the three dimensional space. In particular, the server may generate, based on the five dimensional spatial information and the set of input images, the neural radiance field model that indicates a volume density and an emitted radiance associated with the item (e.g., a ship depicted in FIG. 6) at a set of three dimensional points within the three dimensional space.

Spherical harmonics may include a low-dimensional representation for spherical functions and may be used to model Lambertian surfaces or glossy surfaces. The neural radiance field spherical harmonics model 600 and the neural radiance field model may use a common optimization procedure and volume rendering method. However, the neural radiance field spherical harmonics model 600 may predict a set of one or more spherical harmonic coefficients $k_i^x$ instead of predicting the RGB color c for each three dimensional point (e.g., point 605). Spherical harmonics may refer to a set of functions defined on the surface of a sphere. A set of one or more spherical harmonic coefficients $k_i^x$ may represent a weighting applied to each spherical harmonic function in the set of spherical harmonic functions. The neural radiance field spherical harmonics model 600 may assign values to one or more coefficients in a particular viewing direction, and summing across the set of functions, that are respectively weighted by the one or more spherical harmonic coefficients $k_i^x$, in the particular viewing direction may be used to determine a color value c of a three dimensional point when viewed from that viewing direction.

In some examples, the neural radiance field spherical harmonics model 600 may use the three dimensional coordinates in the three dimensional space and the two dimensional viewing direction (e.g., along ray 610) to determine a color c of each three dimensional point along each ray. The color c may be calculated by summing the weighted spherical harmonic coefficients evaluated at the corresponding ray direction (θ, φ). The spherical harmonics enable the representation to model view-dependent appearance. As depicted in the example of FIG. 6, the server may generate spherical harmonics for each point 605 at each viewing direction along each ray 610. The server may then calculate a color for a particular voxel (or three dimensional point) at that viewing direction in 3D space. When the viewing direction changes, the output color for a particular voxel may also change, thus providing a realistic three dimensional model of an item. The server may similarly process each image in the set of images in each viewing direction (e.g., along ray 610(to determine a color c of each three dimensional point.

Figure 7:
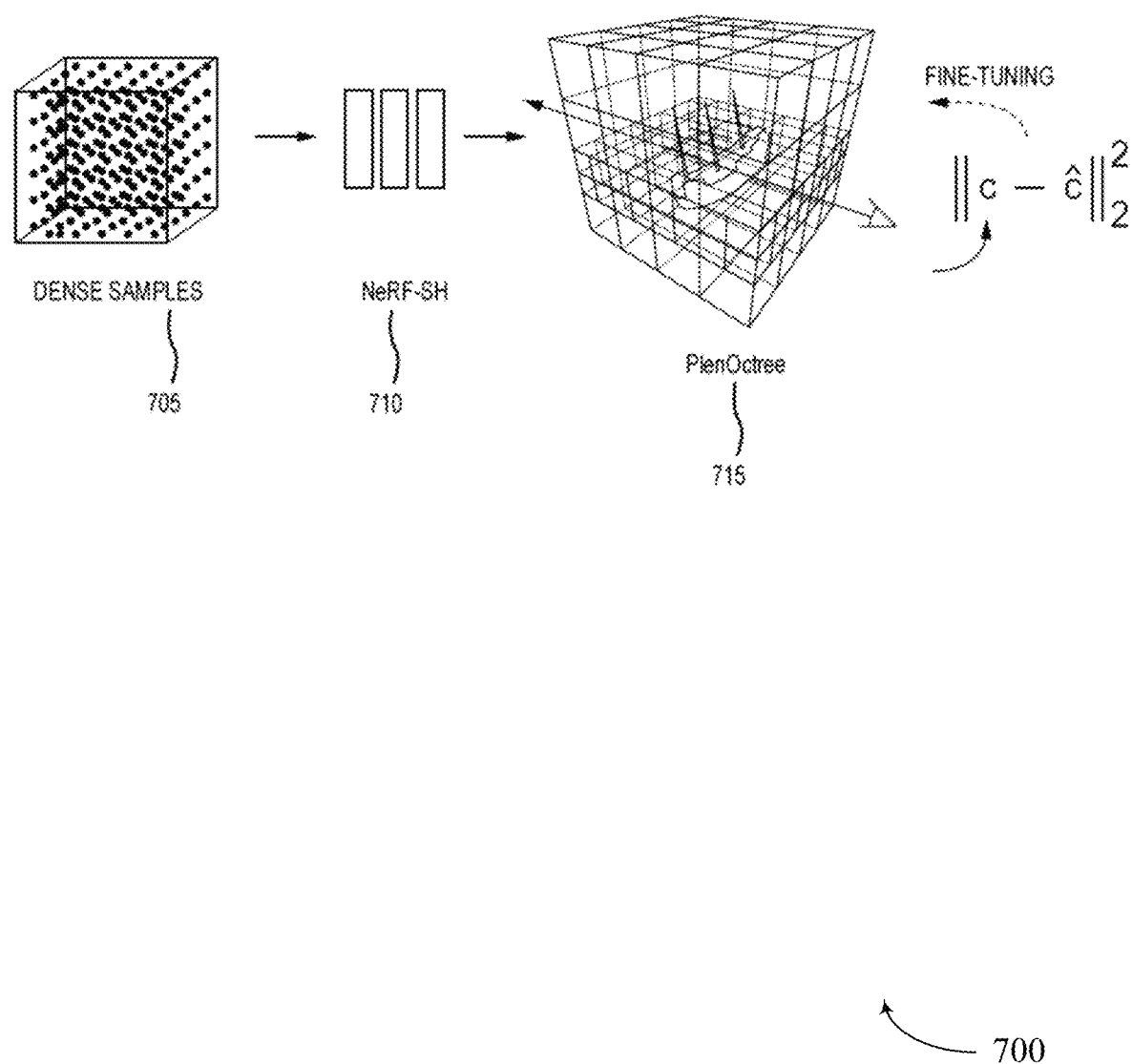
FIG. 7 illustrates an example of a webpage that supports techniques for generating a three dimensional model for a listing in accordance with aspects of the present.

FIG. 7 illustrates an example of a PlenOctree conversion operation 700 that supports techniques for generating a three dimensional model for a listing in accordance with aspects of the present disclosure. A user may capture a set of images of an item using an application in a user device. A server (e.g., a server associated with an online marketplace) may receive the set of images and may implement a set of algorithms to generate a three dimensional model of the item.

For generating the three dimensional model, the server may generate a neural radiance field model and may then generate a neural radiance field spherical harmonic model. For example, the server may generate a neural radiance field model of the item in a three dimensional space based on the set of images, spatial information, and viewing direction information of the item. The server may then generate a set of spherical harmonics for the neural radiance field model based on predicting one or more spherical harmonic coefficients using the set of images, the spatial information, and the viewing direction information. In some examples, the set of spherical harmonics may indicate a set of radiance values each being associated with a respective three dimensional point in the three dimensional space. Thus, the neural radiance field may include a method for synthesizing novel views of complex scenes by optimizing an underlying continuous volumetric scene function using a sparse set of input views. The algorithm outputs the volume density and view-dependent emitted radiance at a particular spatial location, corresponding to each view direction of each image relative to the object. The neural radiance field may synthesize views by querying five dimensional coordinates along camera rays and using volume rendering techniques to project the output colors and densities into an image. Because volume rendering is naturally differentiable, an input for optimizing its representation may include a set of images with known camera poses.

The conversion process from neural radiance field to neural radiance field spherical harmonics may be divided into three steps. The server may first generate a set of dense samples 705 in 3D space as an output of the neural radiance field. The server may evaluate the network on a grid, retaining volume density values, then filtering the voxels via thresholding. That is, the dense samples 705 may be filtered using a threshold density value, and samples that do not satisfy the threshold volume density value may be removed. The server may then sample random points within each remaining voxel in the 3D model and perform a statistical function to each of the color value samples corresponding to a respective 3D point (e.g., average color values in the different images for each 3D point) to obtain the spherical harmonic coefficients 710 for each 3D point, and the statistical functional function of the samples are stored in the octree leaves. Aliasing is an undesired effect in which the sampling frequency is too low to accurately reproduce the original content, resulting in pixelated artifacts in the image. Thus, the sampling process reduces aliasing by keeping the sampling frequency high.

The server may then sample (e.g., pre-sample) the neural radiance field model into a tabulated view-dependent volume. In particular, the server may enable real-time rendering by pre-sampling the neural radiance field into a tabulated view-dependent volume which may be referred to as a PlenOctree 715. In some examples, the server may use a sparse voxel-based octree where every leaf of the tree stores the appearance and density values used to model the radiance (e.g., color) at a point in the volume. In order to account for non-Lambertian materials that exhibit view-dependent effects, the model may represent the RGB values at a location with spherical harmonics (for functions defined on the surface of the sphere). In some examples, the server can evaluate the spherical harmonics at arbitrary query. According to aspects depicted herein, the server may implement the PlenOctree conversion operation 700 to generate a three dimensional model of an item for generating a listing in an online marketplace. The server may then output the three dimensional model of the item depicted in the set of images. A user may manipulate the three dimensional model to obtain different views of the item or object depicted in the set of input images.

Thus, the techniques depicted herein provide for using an application to capture a set of images. The neural radiance field may improve a three dimensional reconstruction robustness and handle transparent or reflective scenes. Network pruning and neural radiance field spherical harmonics may improve rendering speed. Visual cone ray casting and averaging multi-view embedding may improve rendering robustness when changing views. In addition, network pruning, visual cone ray casting, averaging multi-view embedding and finetuning PlenOctree may improve detail quality and may add high frequency details to the three dimensional model of the item.

Figure 8:
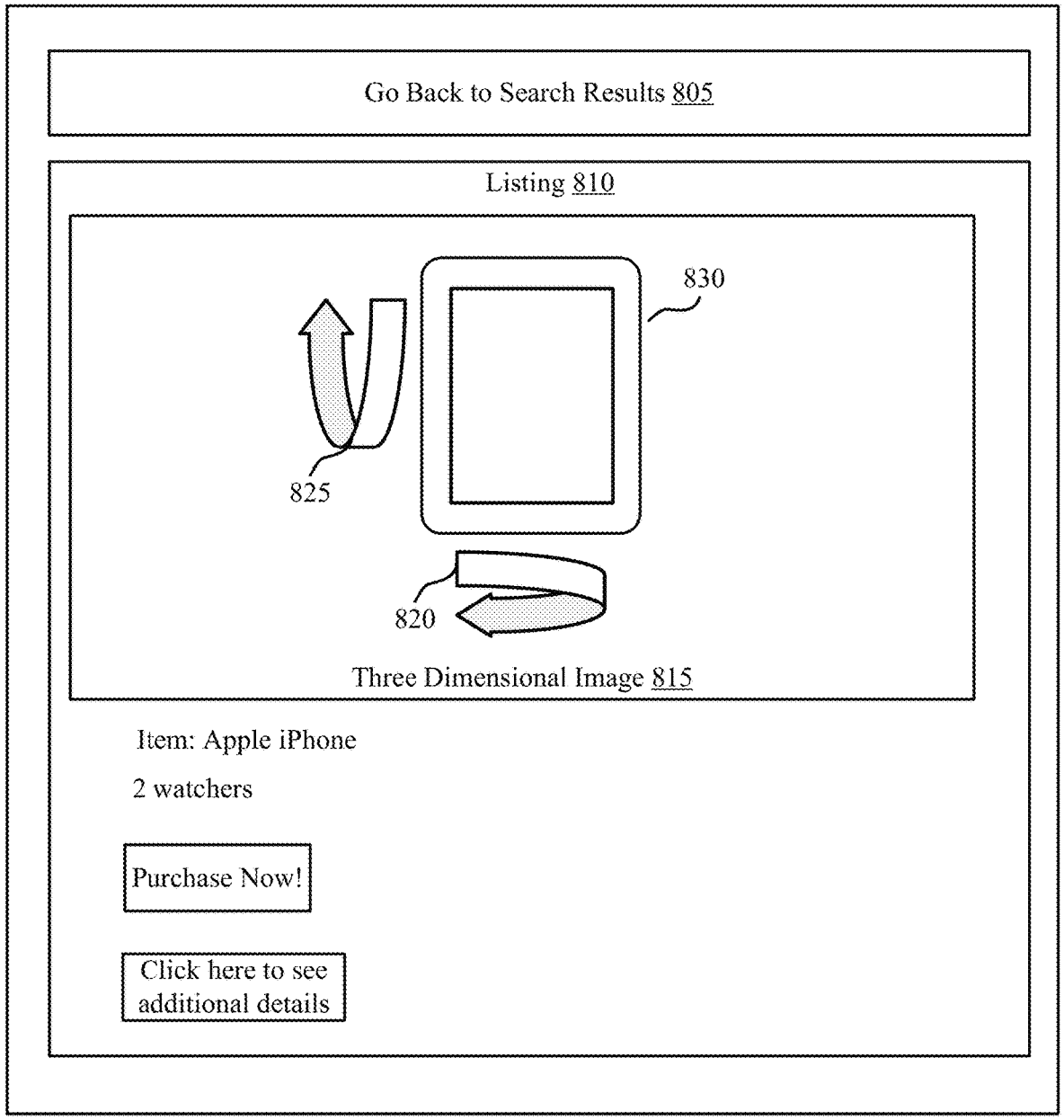
FIG. 8 illustrates an example of a process flow that supports techniques for generating a three dimensional model for a listing in accordance with aspects of the present

FIG. 8 illustrates an example of a webpage 800 that supports techniques for generating a three dimensional model for a listing in accordance with aspects of the present disclosure. A webpage 800 may be an example of a page displaying a listing selected from a set of results based on a buyer-inputted search query. A set of search results may be displayed to a prospective buyer at a user device (e.g., user device 110) at a tablet, smartphone, or another client-facing user device.

A buyer may access an online application (e.g., a website or a smart-phone app) of an online marketplace and input a search query. In an example, the buyer may enter a search for purchasing a mobile device. In an example, a buyer may input "Apple iPhone" as a search query. The search query may result in the display at the buyer user device of a set of search results that includes a listing 810. The listings 810 may include a three dimensional image of an item 830 generated based on a set of seller-uploaded two dimensional images of the item.

As depicted in the FIG. 8, the listing 810 may include a three dimensional image 815 associated with the listing 810.

The webpage 800 may include an option 805 for the buyer to go back to search results. The listing 810 may be generated by sellers (e.g., users utilizing a user device 110 to upload a set of two dimensional images) that relate to the search query input by the buyer. The listing 810 may include information about the item for sale (e.g., Apple iPhone), a number of watchers interested in the item, a price for the item (e.g., if using a purchase now feature), an option to view additional details (e.g., seller uploaded details) for the item, or the like. In the depicted example, the listing 810 includes a three dimensional image of an "Apple iPhone" that can be manipulated by the buyer. The listing 810 may provide a first option 820 to rotate the three dimensional image along a horizontal axis. Additionally, the listing 810 may provide a second option 820 to rotate the three dimensional image along a vertical axis.

To view the various views of the 3D model of the item 830, a location of a cursor or user's finger on a display screen of a client device may be translated into the five dimensional spatial information that indicates three dimensional coordinates (e.g., x, y, z) and the viewing direction (e.g., (θ, (p)) in the three dimensional space. The three dimensional model of the item 830 generated by the neural radiance field model, as described herein, may project colors and densities of voxels into the image 815 corresponding to the five dimensional spatial information, for presentation of the listing 810 on a display screen of a client device. As the user changes the location of the cursor or the user's finger on the display screen, the new location may be translated into a new five dimensional spatial information that indicates three dimensional coordinates (e.g., x, y, z) and the viewing direction (e.g., (θ, (p)) in the three dimensional space. The three dimensional model of the item 830 generated by the neural radiance field model, as described herein, may project colors and densities of voxels into the image 815 corresponding to the new five dimensional spatial information, for presentation of the listing 810 on a display screen of a client device. Thus, the user may move the cursor or user's finger on the display screen in any desired direction, and the three dimensional model of the item 830 may be updated to display the object 830 from any desired direction. As such, the techniques described herein may be used to generate a three dimensional view of an item from a series of images of the item.

Figure 9:
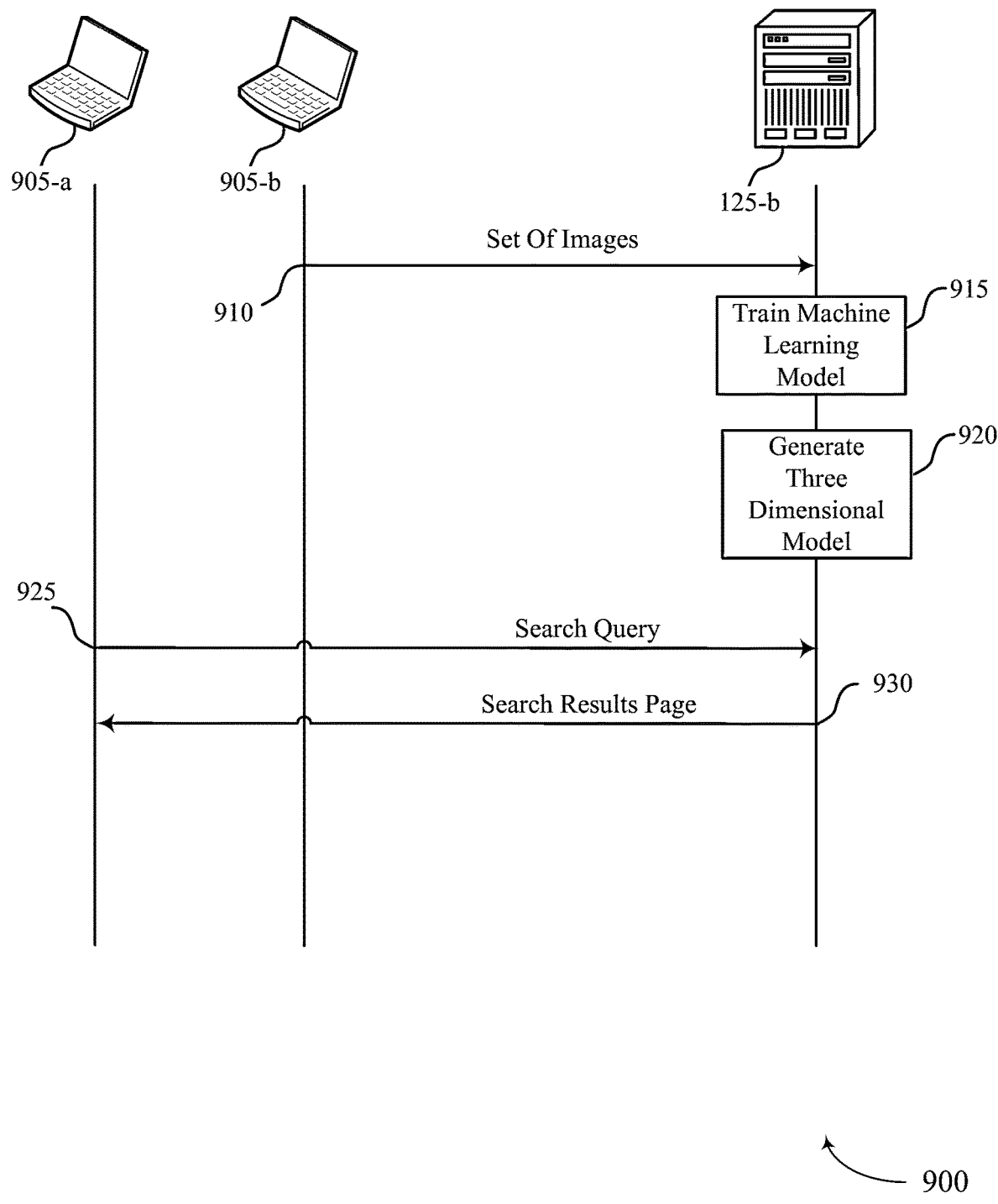
FIG. 9 illustrates an example of a PlenOctree conversion operation that supports techniques for generating a three dimensional model for a listing in accordance with aspects of the present disclosure.

FIG. 9 illustrates an example of a process flow that supports techniques for generating a three dimensional model for a listing in accordance with aspects of the present disclosure. Process flow 900 may include a server system 125-b, a buyer user device 905-a, and a seller user device 905-b. Server system 125-b may be an example of server system 125 as described with reference to FIG. 1. Buyer user device 905-a and seller user device 905-b may be example of a user device 110 as described with reference to FIG. 1. Seller user device 905-b may be a device that a seller uses to upload a set of images for an item and generate a listing for the item for sale via an online marketplace. Buyer user device 905-a may be a device that a prospective buyer may use to access the online marketplace, such as via a smartphone app or a website, to search for items listed for sale and to complete purchase transactions.

At 910, the server system 125-b may receive a set of images of an item. The server system 125-b may also receive spatial information associated with each image of the set of images indicating a relative spatial location to the item for each image of the set of images, and viewing direction information indicating a viewing direction relative to the item for each image of the set of images (e.g., θ, ϕ of a camera ray corresponding to a viewing direction of an image relative to the item).

At 915, the server system 125-b may train a machine learning model based on the set of images. For instance, the server system 125-b may generate a neural radiance field model of the item in a three dimensional space based on the set of images, the spatial information, and the viewing direction information. Additionally or alternatively, the server system 125-b may generate a set of spherical harmonics for the neural radiance field model based on predicting one or more spherical harmonic coefficients using the set of images, the spatial information, and the viewing direction information. In some cases, the set of spherical harmonics may indicate a set of radiance values, each being associated with a respective three dimensional point in the three dimensional space. At 920, the server system 125-b may generate a three dimensional model of the item based on the set of spherical harmonics. At 920, the server system 125-b may receive, from buyer user device 905-a, a search query that may be mapped to the item. The server system 125-b may map the search query to the item where the text input into the search query best matches the item. The server system 125-b may receive, from the buyer user device 905-a, or another user device, a second search query that may be mapped to the item.

At 930, the server system 125-b may transmit, to buyer user device 905-a, a query response that includes the three dimensional model of the item. For example, the server system 125-b may transmit a search results page that includes at least a first listing and the three dimensional model of the item. In some examples, the three dimensional model may entirely reside at the server system 125-b. When the user indicates a desired location on a display screen (e.g., via touch input or via a mouse input), the user device 905-a may transmit, to the server system 125-b, an indication of the five dimensional spatial information. The server system 125-b may apply the three dimensional model of the item generated by the neural radiance field model, as described herein, to project colors and densities of voxels into an image of the item corresponding to the five dimensional spatial information, that is transmitted to the user device 905-a for presentation in a display screen.

Figure 10:
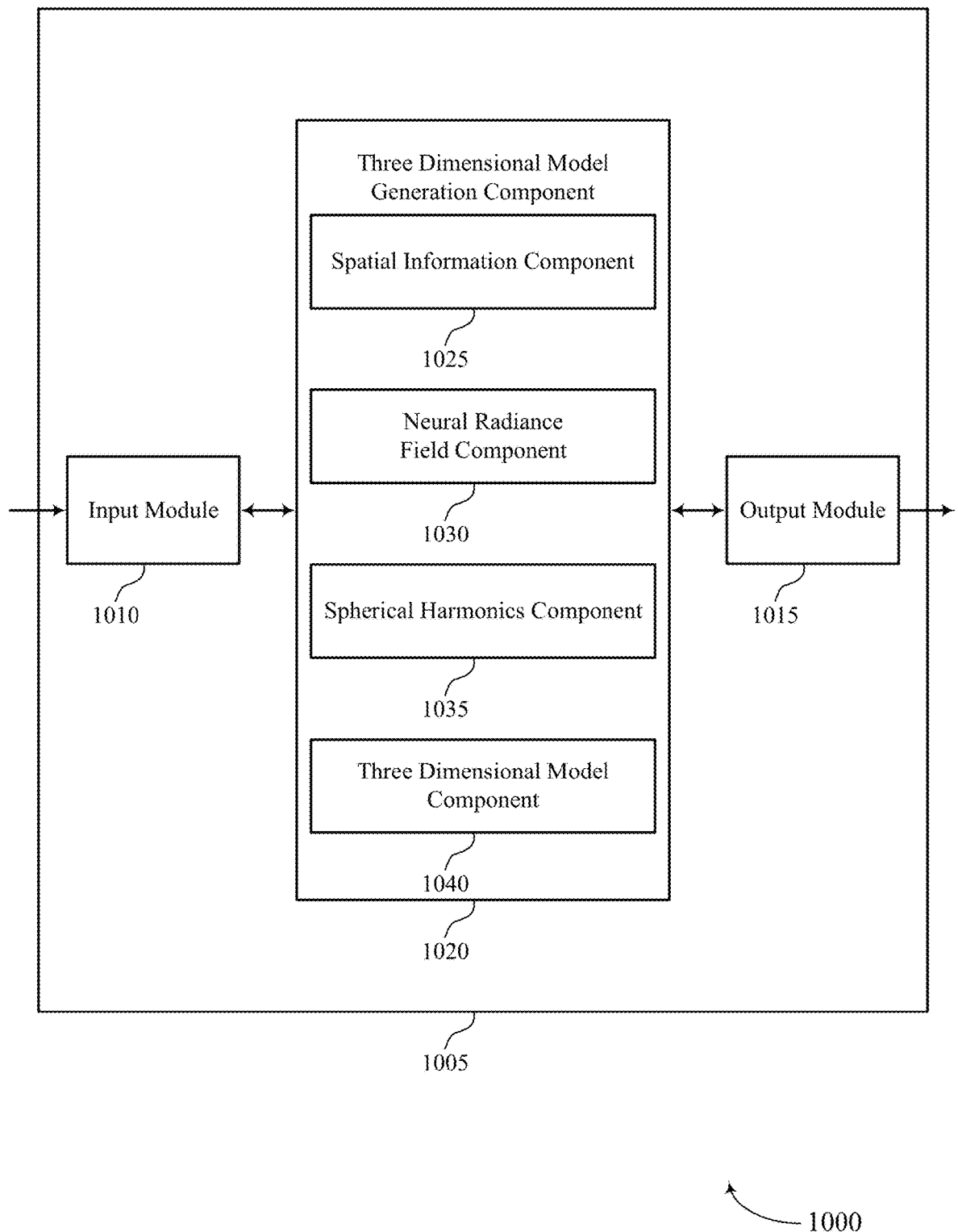
FIG. 10 shows a block diagram of an apparatus that supports techniques for generating a three dimensional model for a listing in accordance with aspects of the present disclosure.

FIG. 10 shows a block diagram 1000 of a device 1005 that supports techniques for generating a three dimensional model for a listing in accordance with aspects of the present disclosure. The device 1005 may include an input module 1010, an output module 1015, and a three dimensional model generation component 1020. The device 1005 may also include a processor. Each of these components may be in communication with one another (e.g., via one or more buses).

The input module 1010 may manage input signals for the device 1005. For example, the input module 1010 may identify input signals based on an interaction with a modem, a keyboard, a mouse, a touchscreen, or a similar device. These input signals may be associated with user input or processing at other components or devices. In some cases, the input module 1010 may utilize an operating system such as iOS®, ANDROID®, MS-DOS®, MS-WINDOWS®, OS/2®, UNIX®, LINUX®, or another known operating system to handle input signals. The input module 1010 may send aspects of these input signals to other components of the device 1005 for processing. For example, the input module 1010 may transmit input signals to the three dimensional model generation component 1020 to support techniques for generating a three dimensional model for a listing.

In some cases, the input module 1010 may be a component of an I/O controller 1210 as described with reference to FIG. 12.

The output module 1015 may manage output signals for the device 1005. For example, the output module 1015 may receive signals from other components of the device 1005, such as the three dimensional model generation component 1020, and may transmit these signals to other components or devices. In some examples, the output module 1015 may transmit output signals for display in a user interface, for storage in a database or data store, for further processing at a server or server cluster, or for any other processes at any number of devices or systems. In some cases, the output module 1015 may be a component of an I/O controller 1210 as described with reference to FIG. 12.

For example, the three dimensional model generation component 1020 may include a spatial information component 1025, a neural radiance field component 1030, a spherical harmonics component 1035, a three dimensional model component 1040, or any combination thereof. In some examples, the three dimensional model generation component 1020, or various components thereof, may be configured to perform various operations (e.g., receiving, monitoring, transmitting) using or otherwise in cooperation with the input module 1010, the output module 1015, or both. For example, the three dimensional model generation component 1020 may receive information from the input module 1010, send information to the output module 1015, or be integrated in combination with the input module 1010, the output module 1015, or both to receive information, transmit information, or perform various other operations as described herein.

The three dimensional model generation component 1020 may support generating a listing for an item in accordance with examples as disclosed herein. The spatial information component 1025 may be configured as or otherwise support a means for receiving a set of multiple images of an item, spatial information associated with each image of the set of multiple images indicating a relative spatial location to the item for each image of the set of multiple images, and viewing direction information indicating a viewing direction relative to the item for each image of the set of multiple images. The neural radiance field component 1030 may be configured as or otherwise support a means for generating a neural radiance field model of the item in a three dimensional space based on the set of multiple images, the spatial information, and the viewing direction information. The spherical harmonics component 1035 may be configured as or otherwise support a means for generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space. The three dimensional model component 1040 may be configured as or otherwise support a means for outputting a three dimensional model of the item generated based on the set of multiple spherical harmonics.

Figure 11:
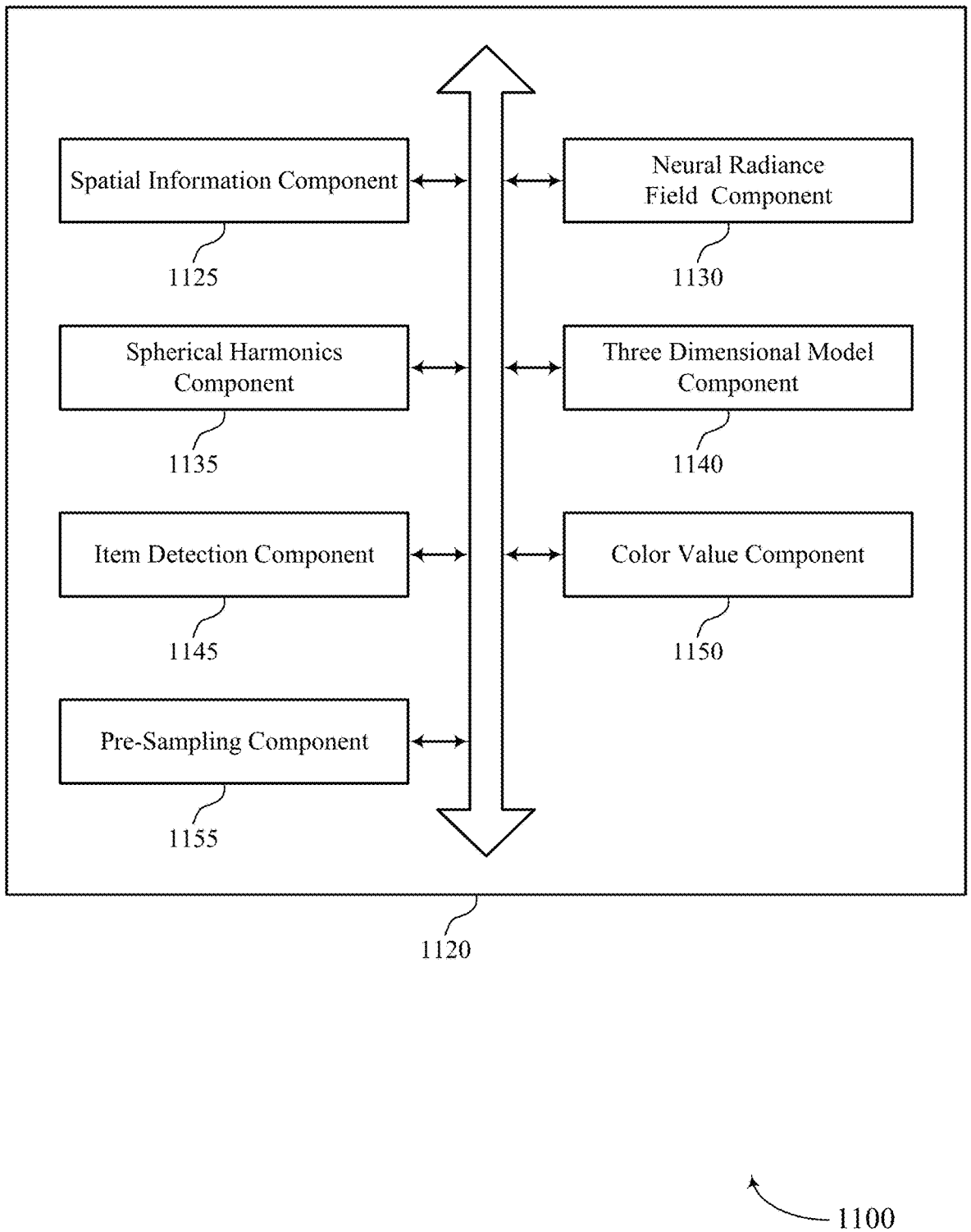
FIG. 11 shows a block diagram of a three dimensional model generation component that supports techniques for generating a three dimensional model for a listing in accordance with aspects of the present disclosure.

FIG. 11 shows a block diagram 1100 of a three dimensional model generation component 1120 that supports techniques for generating a three dimensional model for a listing in accordance with aspects of the present disclosure. The three dimensional model generation component 1120 may be an example of aspects of a three dimensional model generation component or a three dimensional model generation component 1020, or both, as described herein. The three dimensional model generation component 1120, or various components thereof, may be an example of means for performing various aspects of techniques for generating a three dimensional model for a listing as described herein. For example, the three dimensional model generation component 1120 may include a spatial information component 1125, a neural radiance field component 1130, a spherical harmonics component 1135, a three dimensional model component 1140, an item detection component 1145, a color value component 1150, a pre-sampling component 1155, or any combination thereof. Each of these components may communicate, directly or indirectly, with one another (e.g., via one or more buses).

The three dimensional model generation component 1120 may support generating a listing for an item in accordance with examples as disclosed herein. The spatial information component 1125 may be configured as or otherwise support a means for receiving a set of multiple images of an item, spatial information associated with each image of the set of multiple images indicating a relative spatial location to the item for each image of the set of multiple images, and viewing direction information indicating a viewing direction relative to the item for each image of the set of multiple images. The neural radiance field component 1130 may be configured as or otherwise support a means for generating a neural radiance field model of the item in a three dimensional space based on the set of multiple images, the spatial information, and the viewing direction information. The spherical harmonics component 1135 may be configured as or otherwise support a means for generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space. The three dimensional model component 1140 may be configured as or otherwise support a means for outputting a three dimensional model of the item generated based on the set of multiple spherical harmonics.

In some examples, generating, based on the five dimensional spatial information, the neural radiance field model that indicates a volume density and an emitted radiance associated with the item at a set of multiple three dimensional points within the three dimensional space.

In some examples, to support generating the neural radiance field model, the neural radiance field component 1130 may be configured as or otherwise support a means for generating a later iteration of the neural radiance field model based on removing one or more weights from a prior iteration of the neural radiance field model that do not satisfy an activation criterion.

In some examples, to support generating the neural radiance field model, the neural radiance field component 1130 may be configured as or otherwise support a means for generating the neural radiance field model based on casting a cone for each pixel of each image of the set of multiple images, where the cone is cast into a series of conical frustums.

In some examples, to support generating the neural radiance field model, the item detection component 1145 may be configured as or otherwise support a means for determining that multiple images of the set of multiple images depict the item at a defined three dimensional point in the three dimensional space. In some examples, to support generating the neural radiance field model, the color value component 1150 may be configured as or otherwise support a means for adjusting a color value of the item corresponding to the defined three dimensional point in one or more of the multiple images with a statistical value for the color value at the defined three dimensional point determined from the set of multiple images.

In some examples, the color value component 1150 may be configured as or otherwise support a means for calculating a color value for the item at a three dimensional point in the three dimensional space based on a function of the one or more spherical harmonic coefficients associated with the item that are evaluated at corresponding ray directions associated with the three dimensional point.

In some examples, the pre-sampling component 1155 may be configured as or otherwise support a means for sampling (e.g., pre-sampling) the neural radiance field model into a tabulated view-dependent volume, where outputting the three dimensional model of the item generated is based on sampling e.g., pre-sampling) the neural radiance field model.

Figure 12:
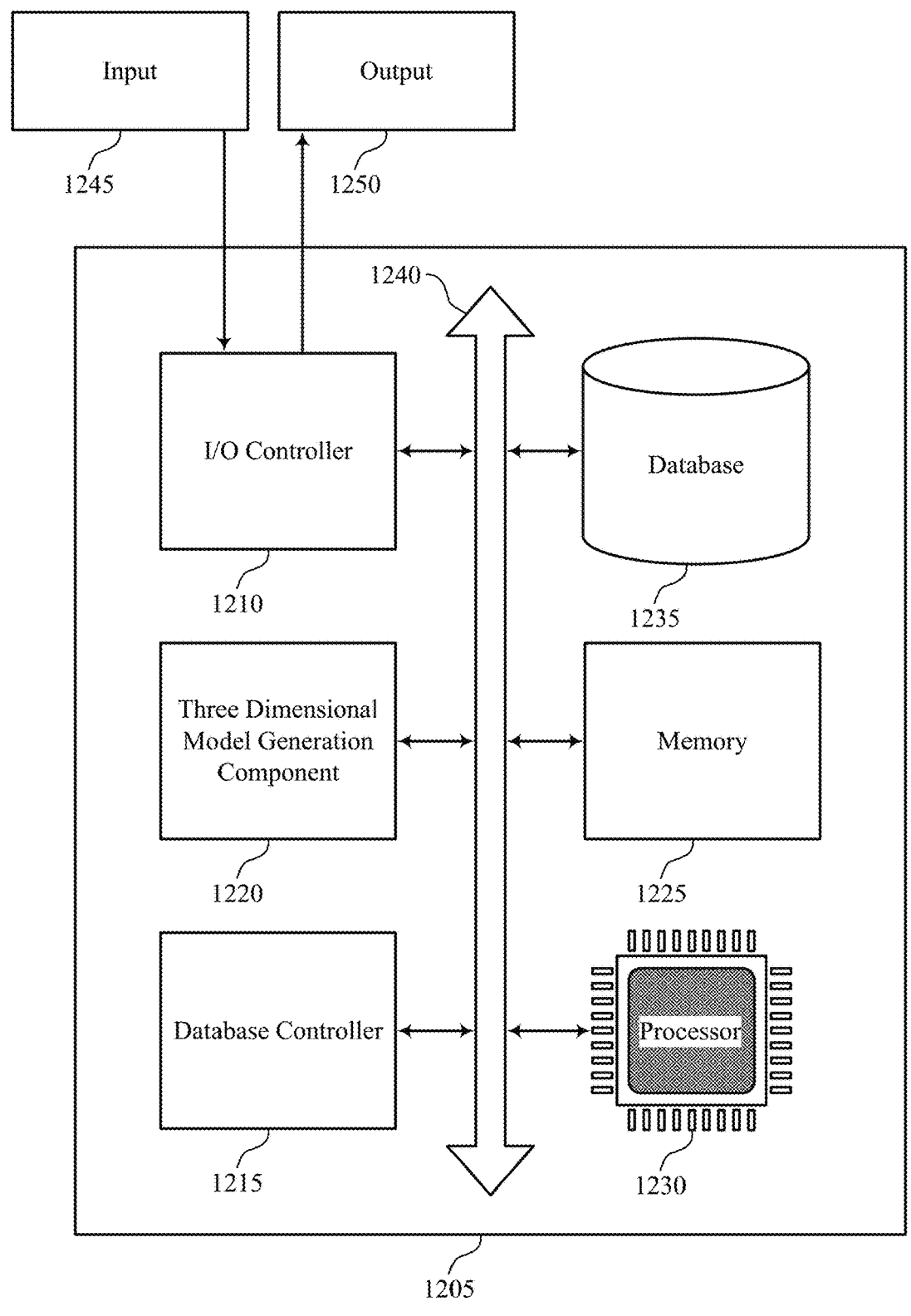
FIG. 12 shows a diagram of a system including a device that supports techniques for generating a three dimensional model for a listing in accordance with aspects of the present disclosure.

FIG. 12 shows a diagram of a system 1200 including a device 1205 that supports techniques for generating a three dimensional model for a listing in accordance with aspects of the present disclosure. The device 1205 may be an example of or include the components of a device 1005 as described herein. The device 1205 may include components for bi-directional data communications including components for transmitting and receiving communications, such as a three dimensional model generation component 1220, an I/O controller 1210, a database controller 1215, a memory 1225, a processor 1230, and a database 1235. These components may be in electronic communication or otherwise coupled (e.g., operatively, communicatively, functionally, electronically, electrically) via one or more buses (e.g., a bus 1240).

The I/O controller 1210 may manage input signals 1245 and output signals 1250 for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. In other cases, the I/O controller 1210 may represent or interact with a modem, a keyboard, a mouse, a touchscreen, or a similar device. In some cases, the I/O controller 1210 may be implemented as part of a processor 1230. In some examples, a user may interact with the device 1205 via the I/O controller 1210 or via hardware components controlled by the I/O controller 1210.

The database controller 1215 may manage data storage and processing in a database 1235. In some cases, a user may interact with the database controller 1215. In other cases, the database controller 1215 may operate automatically without user interaction. The database 1235 may be an example of a single database, a distributed database, multiple distributed databases, a data store, a data lake, or an emergency backup database.

Memory 1225 may include random-access memory (RAM) and ROM. The memory 1225 may store computer-readable, computer-executable software including instructions that, when executed, cause the processor 1230 to perform various functions described herein. In some cases, the memory 1225 may contain, among other things, a BIOS which may control basic hardware or software operation such as the interaction with peripheral components or devices.

The processor 1230 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1230 may be configured to operate a memory array using a memory controller. In other cases, a memory controller may be integrated into the processor 1230. The processor 1230 may be configured to execute computer-readable instructions stored in a memory 1225 to perform various functions (e.g., functions or tasks supporting techniques for generating a three dimensional model for a listing).

The three dimensional model generation component 1220 may support generating a listing for an item in accordance with examples as disclosed herein. For example, the three dimensional model generation component 1220 may be configured as or otherwise support a means for receiving a set of multiple images of an item, spatial information associated with each image of the set of multiple images indicating a relative spatial location to the item for each image of the set of multiple images, and viewing direction information indicating a viewing direction relative to the item for each image of the set of multiple images. The three dimensional model generation component 1220 may be configured as or otherwise support a means for generating a neural radiance field model of the item in a three dimensional space based on the set of multiple images, the spatial information, and the viewing direction information. The three dimensional model generation component 1220 may be configured as or otherwise support a means for generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space. The three dimensional model generation component 1220 may be configured as or otherwise support a means for outputting a three dimensional model of the item generated based on the set of multiple spherical harmonics.

By including or configuring the three dimensional model generation component 1220 in accordance with examples as described herein, the device 1205 may support techniques for enhanced user experience in browsing an online marketplace.

Figure 13:
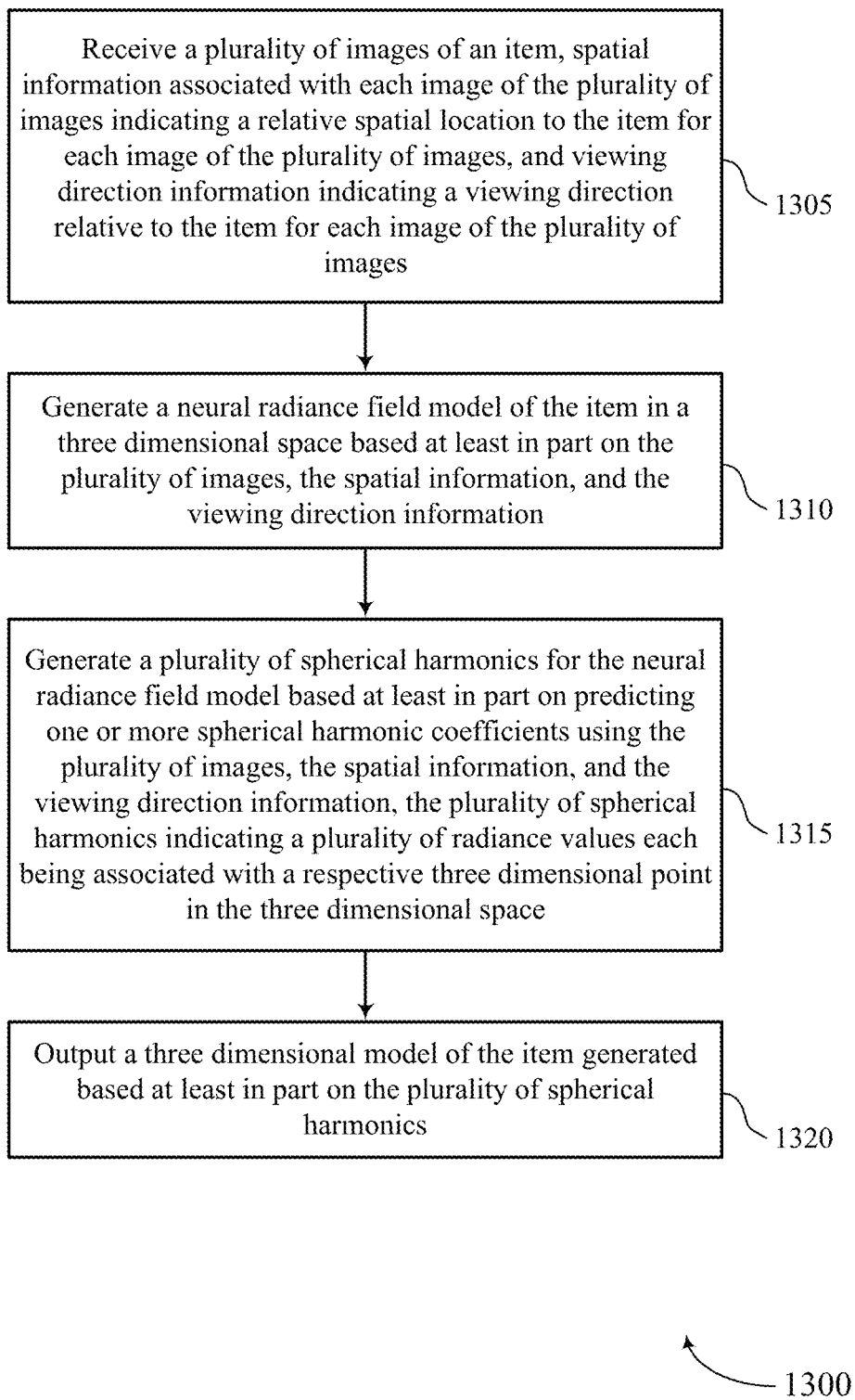
FIGS. 13 through 16 show flowcharts illustrating methods that support techniques for generating a three dimensional model for a listing in accordance with aspects of the present disclosure.

FIG. 13 shows a flowchart illustrating a method 1300 that supports techniques for generating a three dimensional model for a listing in accordance with aspects of the present disclosure. The operations of the method 1300 may be implemented by an application server or its components as described herein. For example, the operations of the method 1300 may be performed by an application server as described with reference to FIGS. 1 through 12. In some examples, an application server may execute a set of instructions to control the functional elements of the application server to perform the described functions. Additionally, or alternatively, the application server may perform aspects of the described functions using special-purpose hardware.

At 1305, the method may include receiving a set of multiple images of an item, spatial information associated with each image of the set of multiple images indicating a relative spatial location to the item for each image of the set of multiple images, and viewing direction information indicating a viewing direction relative to the item for each image of the set of multiple images. The operations of 1305 may be performed in accordance with examples as disclosed herein. In some examples, aspects of the operations of 1305 may be performed by a spatial information component 1125 as described with reference to FIG. 11.

At 1310, the method may include generating a neural radiance field model of the item in a three dimensional space based on the set of multiple images, the spatial information, and the viewing direction information. The operations of 1310 may be performed in accordance with examples as disclosed herein. In some examples, aspects of the operations of 1310 may be performed by a neural radiance field component 1130 as described with reference to FIG. 11.

At 1315, the method may include generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space. The operations of 1315 may be performed in accordance with examples as disclosed herein. In some examples, aspects of the operations of 1315 may be performed by a spherical harmonics component 1135 as described with reference to FIG. 11.

At 1320, the method may include outputting a three dimensional model of the item generated based on the set of multiple spherical harmonics. The operations of 1320 may be performed in accordance with examples as disclosed herein. In some examples, aspects of the operations of 1320 may be performed by a three dimensional model component 1140 as described with reference to FIG. 11.

Figure 14:
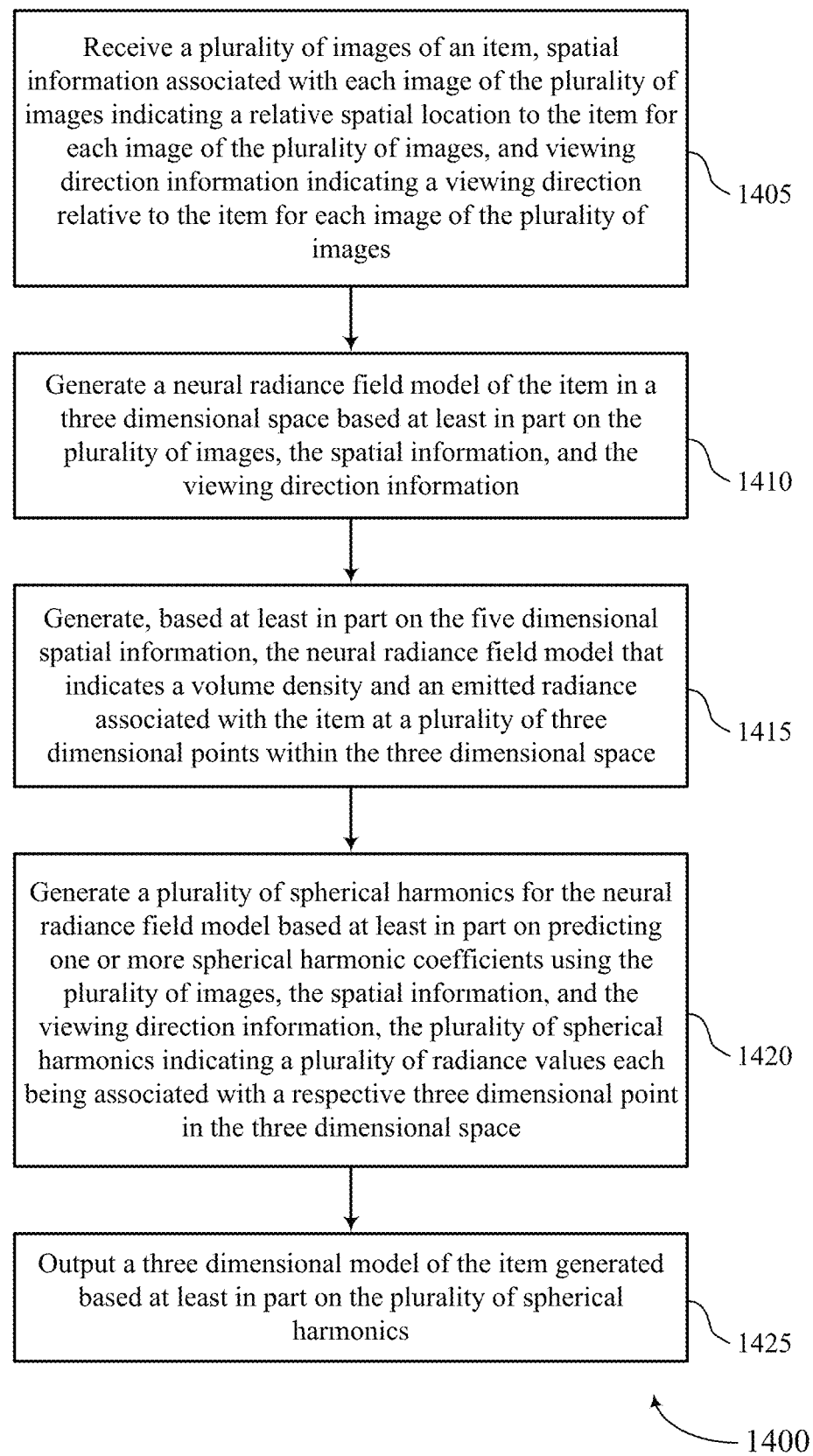

FIG. 14 shows a flowchart illustrating a method 1400 that supports techniques for generating a three dimensional model for a listing in accordance with aspects of the present disclosure. The operations of the method 1400 may be implemented by an application server or its components as described herein. For example, the operations of the method 1400 may be performed by an application server as described with reference to FIGS. 1 through 12. In some examples, an application server may execute a set of instructions to control the functional elements of the application server to perform the described functions. Additionally, or alternatively, the application server may perform aspects of the described functions using special-purpose hardware.

At 1405, the method may include receiving a set of multiple images of an item, spatial information associated with each image of the set of multiple images indicating a relative spatial location to the item for each image of the set of multiple images, and viewing direction information indicating a viewing direction relative to the item for each image of the set of multiple images. The operations of 1405 may be performed in accordance with examples as disclosed herein. In some examples, aspects of the operations of 1405 may be performed by a spatial information component 1125 as described with reference to FIG. 11.

At 1410, the method may include generating a neural radiance field model of the item in a three dimensional space based on the set of multiple images, the spatial information, and the viewing direction information. The operations of 1410 may be performed in accordance with examples as disclosed herein. In some examples, aspects of the operations of 1410 may be performed by a neural radiance field component 1130 as described with reference to FIG. 11.

At 1415, the method may include generating, based on the five dimensional spatial information, the neural radiance field model that indicates a volume density and an emitted radiance associated with the item at a set of multiple three dimensional points within the three dimensional space. The operations of 1415 may be performed in accordance with examples as disclosed herein. In some examples, aspects of the operations of 1415 may be performed by a neural radiance field component 1130 as described with reference to FIG. 11.

At 1420, the method may include generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space. The operations of 1420 may be performed in accordance with examples as disclosed herein. In some examples, aspects of the operations of 1420 may be performed by a spherical harmonics component 1135 as described with reference to FIG. 11.

At 1425, the method may include outputting a three dimensional model of the item generated based on the set of multiple spherical harmonics. The operations of 1425 may be performed in accordance with examples as disclosed herein. In some examples, aspects of the operations of 1425 may be performed by a three dimensional model component 1140 as described with reference to FIG. 11.

Figure 15:
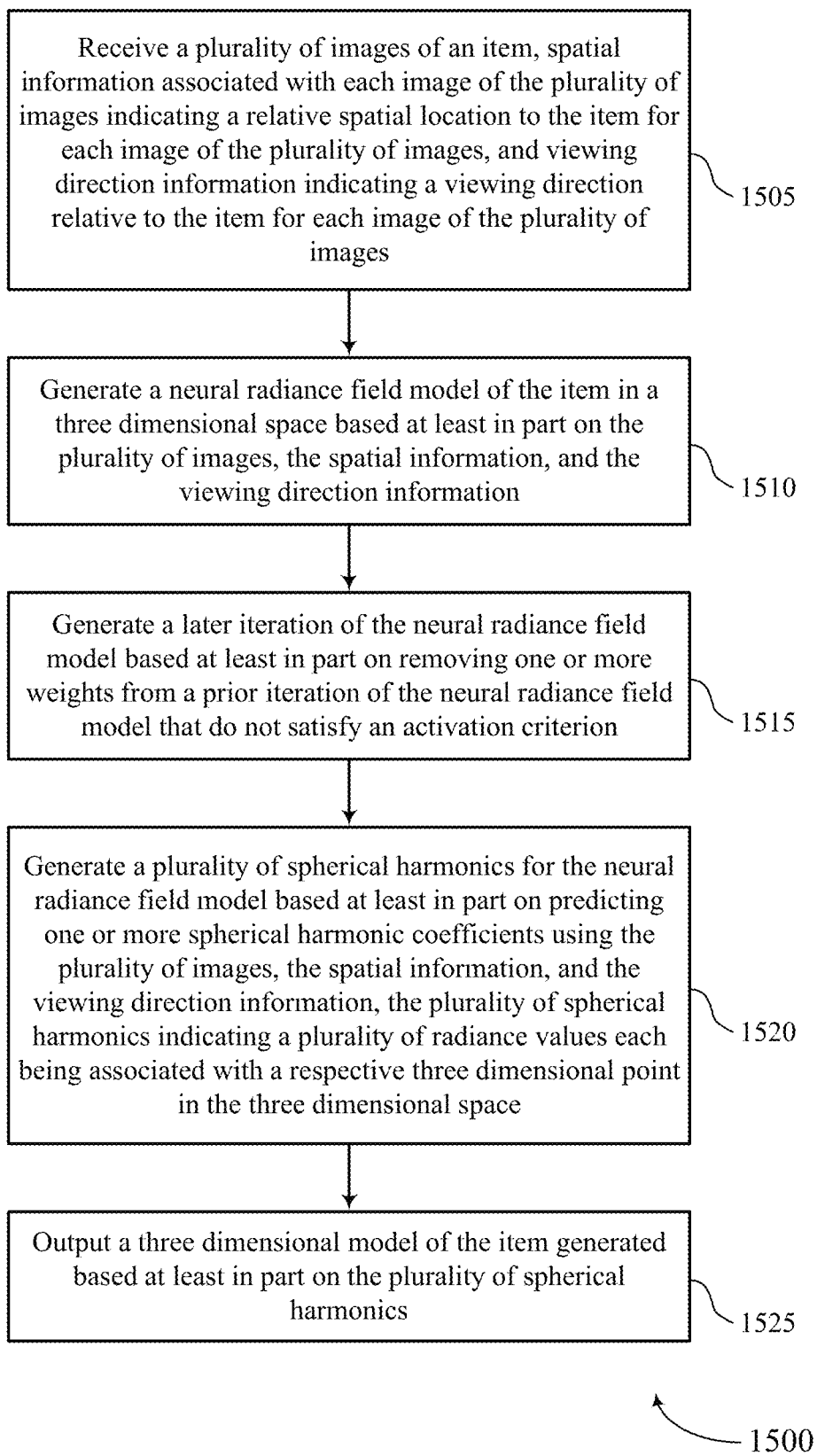

FIG. 15 shows a flowchart illustrating a method 1500 that supports techniques for generating a three dimensional model for a listing in accordance with aspects of the present disclosure. The operations of the method 1500 may be implemented by an application server or its components as described herein. For example, the operations of the method 1500 may be performed by an application server as described with reference to FIGS. 1 through 12. In some examples, an application server may execute a set of instructions to control the functional elements of the application server to perform the described functions. Additionally, or alternatively, the application server may perform aspects of the described functions using special-purpose hardware.

At 1505, the method may include receiving a set of multiple images of an item, spatial information associated with each image of the set of multiple images indicating a relative spatial location to the item for each image of the set of multiple images, and viewing direction information indicating a viewing direction relative to the item for each image of the set of multiple images. The operations of 1505 may be performed in accordance with examples as disclosed herein. In some examples, aspects of the operations of 1505 may be performed by a spatial information component 1125 as described with reference to FIG. 11.

At 1510, the method may include generating a neural radiance field model of the item in a three dimensional space based on the set of multiple images, the spatial information, and the viewing direction information. The operations of 1510 may be performed in accordance with examples as disclosed herein. In some examples, aspects of the operations of 1510 may be performed by a neural radiance field component 1130 as described with reference to FIG. 11.

At 1515, the method may include generating a later iteration of the neural radiance field model based on removing one or more weights from a prior iteration of the neural radiance field model that do not satisfy an activation criterion. The operations of 1515 may be performed in accordance with examples as disclosed herein. In some examples, aspects of the operations of 1515 may be performed by a neural radiance field component 1130 as described with reference to FIG. 11.

At 1520, the method may include generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space. The operations of 1520 may be performed in accordance with examples as disclosed herein. In some examples, aspects of the operations of 1520 may be performed by a spherical harmonics component 1135 as described with reference to FIG. 11.

At 1525, the method may include outputting a three dimensional model of the item generated based on the set of multiple spherical harmonics. The operations of 1525 may be performed in accordance with examples as disclosed herein. In some examples, aspects of the operations of 1525 may be performed by a three dimensional model component 1140 as described with reference to FIG. 11.

Figure 16:
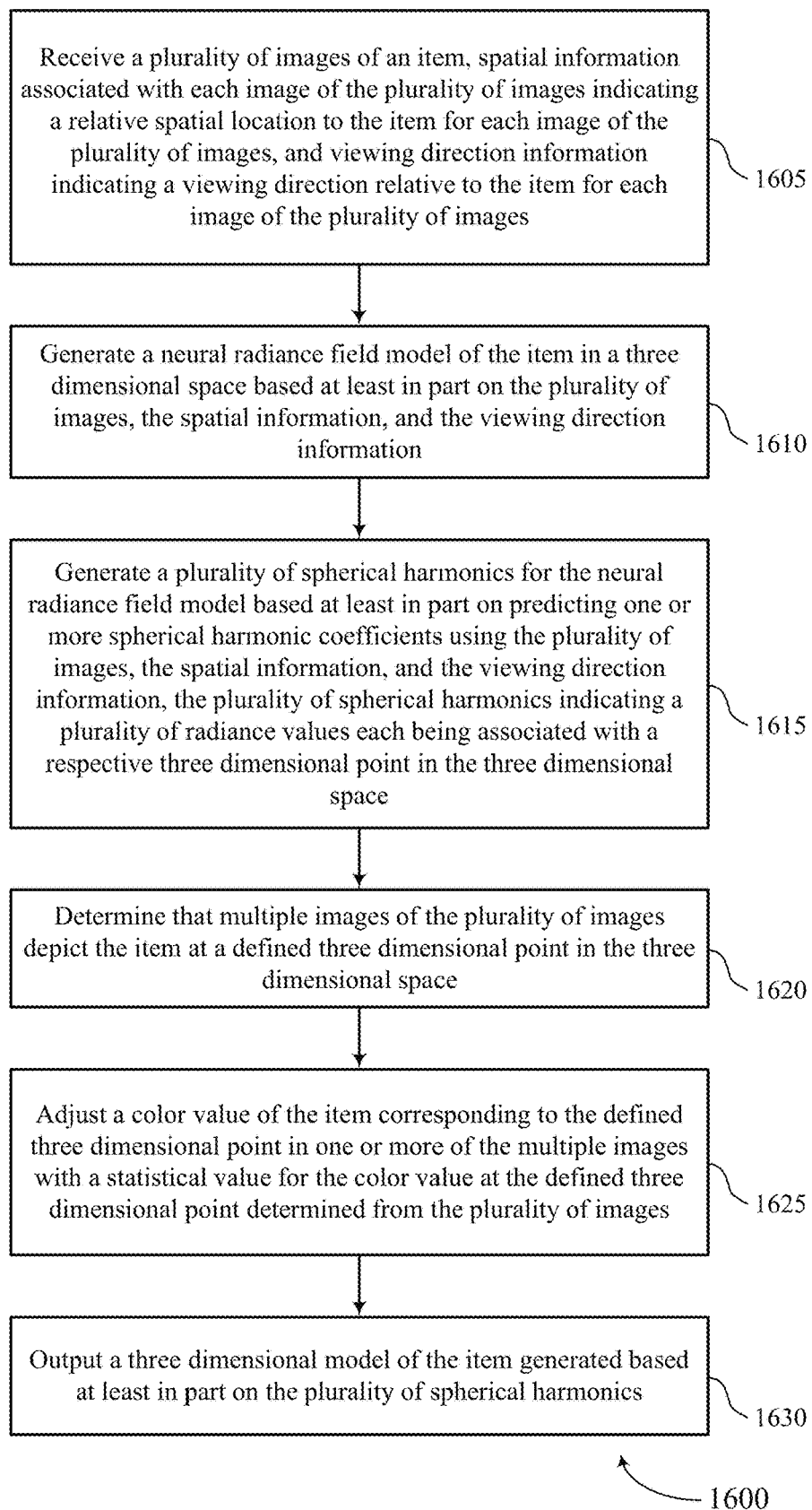

FIG. 16 shows a flowchart illustrating a method 1600 that supports techniques for generating a three dimensional model for a listing in accordance with aspects of the present disclosure. The operations of the method 1600 may be implemented by an application server or its components as described herein. For example, the operations of the method 1600 may be performed by an application server as described with reference to FIGS. 1 through 12. In some examples, an application server may execute a set of instructions to control the functional elements of the application server to perform the described functions. Additionally, or alternatively, the application server may perform aspects of the described functions using special-purpose hardware.

At 1605, the method may include receiving a set of multiple images of an item, spatial information associated with each image of the set of multiple images indicating a relative spatial location to the item for each image of the set of multiple images, and viewing direction information indicating a viewing direction relative to the item for each image of the set of multiple images. The operations of 1605 may be performed in accordance with examples as disclosed herein. In some examples, aspects of the operations of 1605 may be performed by a spatial information component 1125 as described with reference to FIG. 11.

At 1610, the method may include generating a neural radiance field model of the item in a three dimensional space based on the set of multiple images, the spatial information, and the viewing direction information. The operations of 1610 may be performed in accordance with examples as disclosed herein. In some examples, aspects of the operations of 1610 may be performed by a neural radiance field component 1130 as described with reference to FIG. 11.

At 1615, the method may include generating a set of multiple spherical harmonics for the neural radiance field model based on predicting one or more spherical harmonic coefficients using the set of multiple images, the spatial information, and the viewing direction information, the set of multiple spherical harmonics indicating a set of multiple radiance values each being associated with a respective three dimensional point in the three dimensional space. The operations of 1615 may be performed in accordance with examples as disclosed herein. In some examples, aspects of the operations of 1615 may be performed by a spherical harmonics component 1135 as described with reference to FIG. 11.

At 1620, the method may include determining that multiple images of the set of multiple images depict the item at a defined three dimensional point in the three dimensional space. The operations of 1620 may be performed in accordance with examples as disclosed herein. In some examples, aspects of the operations of 1620 may be performed by an item detection component 1145 as described with reference to FIG. 11.

At 1625, the method may include adjusting a color value of the item corresponding to the defined three dimensional point in one or more of the multiple images with a statistical value for the color value at the defined three dimensional point determined from the set of multiple images. The operations of 1625 may be performed in accordance with examples as disclosed herein. In some examples, aspects of the operations of 1625 may be performed by a color value component 1150 as described with reference to FIG. 11.

At 1630, the method may include outputting a three dimensional model of the item generated based on the set of multiple spherical harmonics. The operations of 1630 may be performed in accordance with examples as disclosed herein. In some examples, aspects of the operations of 1630 may be performed by a three dimensional model component 1140 as described with reference to FIG. 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for generating a listing for an item, comprising:
    a processor;
    memory coupled with the processor; and
    instructions stored in the memory and executable by the processor to cause the apparatus to:
        receive a plurality of images of an item, spatial information associated with each image of the plurality of images indicating a relative spatial location to the item for each image of the plurality of images, and viewing direction information indicating a viewing direction relative to the item for each image of the plurality of images;
        generate a neural radiance field model of the item in a three dimensional space based at least in part on the plurality of images, the spatial information, and the viewing direction information, and remove one or more weights from the neural radiance field model that do not satisfy an activation criterion;
        generate a plurality of spherical harmonics for the neural radiance field model based at least in part on predicting one or more spherical harmonic coefficients using the plurality of images, the spatial information, and the viewing direction information, the plurality of spherical harmonics indicating a plurality of radiance values each being associated with a respective three dimensional point in the three dimensional space; and
        output a three dimensional model of the item generated based at least in part on the plurality of spherical harmonics.

2. The apparatus of claim 1, wherein generating, based at least in part on the spatial information, the neural radiance field model that indicates a volume density and an emitted radiance associated with the item at a plurality of three dimensional points within the three dimensional space.

3. The apparatus of claim 1, wherein the instructions to generate the neural radiance field model are executable by the processor to cause the apparatus to:
    remove the one or more weights from the neural radiance field model that do not satisfy the activation criterion by setting the one or more weights to zero based on the one or more weights being below a threshold value.

4. The apparatus of claim 1, wherein the instructions to generate the neural radiance field model are executable by the processor to cause the apparatus to:
    generate the neural radiance field model based at least in part on casting a cone for each pixel of each image of the plurality of images, wherein the cone is cast into a series of conical frustums.

5. The apparatus of claim 1, wherein the instructions to generate the neural radiance field model are executable by the processor to cause the apparatus to:
    determine that multiple images of the plurality of images depict the item at a defined three dimensional point in the three dimensional space; and
    adjust a color value of the item corresponding to the defined three dimensional point in one or more of the multiple images with a statistical value for the color value at the defined three dimensional point determined from the plurality of images.

6. The apparatus of claim 1, wherein the instructions are further executable by the processor to cause the apparatus to:
calculate a color value for the item at a three dimensional point in the three dimensional space based at least in part on a function of the one or more spherical harmonic coefficients associated with the item that are evaluated at corresponding ray directions associated with the three dimensional point.

7. The apparatus of claim 1, wherein the instructions are further executable by the processor to cause the apparatus to:
sample the neural radiance field model into a tabulated view-dependent volume, wherein outputting the three dimensional model of the item generated is based at least in part on sampling the neural radiance field model.

8. A computer-implemented method for generating a listing for an item, comprising:
receiving a plurality of images of an item, spatial information associated with each image of the plurality of images indicating a relative spatial location to the item for each image of the plurality of images, and viewing direction information indicating a viewing direction relative to the item for each image of the plurality of images;
generating a neural radiance field model of the item in a three dimensional space based at least in part on the plurality of images, the spatial information, and the viewing direction information, and removing one or more weights from the neural radiance field model that do not satisfy an activation criterion;
generating a plurality of spherical harmonics for the neural radiance field model based at least in part on predicting one or more spherical harmonic coefficients using the plurality of images, the spatial information, and the viewing direction information, the plurality of spherical harmonics indicating a plurality of radiance values each being associated with a respective three dimensional point in the three dimensional space; and
outputting a three dimensional model of the item generated based at least in part on the plurality of spherical harmonics.

9. The computer-implemented method of claim 8, wherein the spatial information associated with each image of the plurality of images is five dimensional spatial information that indicates three dimensional coordinates in the three dimensional space and the viewing direction comprising a two dimensional viewing direction associated with each image of the plurality of images; and generating, based at least in part on the five dimensional spatial information, the neural radiance field model that indicates a volume density and an emitted radiance associated with the item at a plurality of three dimensional points within the three dimensional space.

10. The computer-implemented method of claim 8, wherein removing the one or more weights from the neural radiance field model that do not satisfy the activation criterion comprises setting the one or more weights to zero based on the one or more weights being below a threshold value.

11. The computer-implemented method of claim 8, wherein generating the neural radiance field model comprises:
generating the neural radiance field model based at least in part on casting a cone for each pixel of each image of the plurality of images, wherein the cone is cast into a series of conical frustums.

12. The computer-implemented method of claim 8, wherein generating the neural radiance field model comprises:
determining that multiple images of the plurality of images depict the item at a defined three dimensional point in the three dimensional space; and
adjusting a color value of the item corresponding to the defined three dimensional point in one or more of the multiple images with a statistical value for the color value at the defined three dimensional point determined from the plurality of images.

13. The computer-implemented method of claim 8, further comprising:
calculating a color value for the item at a three dimensional point in the three dimensional space based at least in part on a function of the one or more spherical harmonic coefficients associated with the item that are evaluated at corresponding ray directions associated with the three dimensional point.

14. The computer-implemented method of claim 8, further comprising:
sampling the neural radiance field model into a tabulated view-dependent volume, wherein outputting the three dimensional model of the item generated is based at least in part on sampling the neural radiance field model.

15. A non-transitory computer-readable medium storing code for generating a listing for an item, the code comprising instructions executable by a processor to:
receive a plurality of images of an item, spatial information associated with each image of the plurality of images indicating a relative spatial location to the item for each image of the plurality of images, and viewing direction information indicating a viewing direction relative to the item for each image of the plurality of images;
generate a neural radiance field model of the item in a three dimensional space based at least in part on the plurality of images, the spatial information, and the viewing direction information, and remove one or more weights from the neural radiance field model that do not satisfy an activation criterion;
generate a plurality of spherical harmonics for the neural radiance field model based at least in part on predicting one or more spherical harmonic coefficients using the plurality of images, the spatial information, and the viewing direction information, the plurality of spherical harmonics indicating a plurality of radiance values each being associated with a respective three dimensional point in the three dimensional space; and
output a three dimensional model of the item generated based at least in part on the plurality of spherical harmonics.

16. The non-transitory computer-readable medium of claim 15, wherein generating, based at least in part on the spatial information, the neural radiance field model that indicates a volume density and an emitted radiance associated with the item at a plurality of three dimensional points within the three dimensional space.

17. The non-transitory computer-readable medium of claim 15, wherein the instructions are executable by the processor to:
remove the one or more weights from the neural radiance field model that do not satisfy the activation criterion by setting the one or more weights to zero based on the one or more weights being below a threshold value.

18. The non-transitory computer-readable medium of claim 15, wherein the instructions to generate the neural radiance field model are executable by the processor to:
generate the neural radiance field model based at least in part on casting a cone for each pixel of each image of the plurality of images, wherein the cone is cast into a series of conical frustums.

19. The non-transitory computer-readable medium of claim 15, wherein the instructions to generate the neural radiance field model are executable by the processor to:
determine that multiple images of the plurality of images depict the item at a defined three dimensional point in the three dimensional space; and
adjust a color value of the item corresponding to the defined three dimensional point in one or more of the multiple images with a statistical value for the color value at the defined three dimensional point determined from the plurality of images.

20. The non-transitory computer-readable medium of claim 15, wherein the instructions are further executable by the processor to:
calculate a color value for the item at a three dimensional point in the three dimensional space based at least in part on a function of the one or more spherical harmonic coefficients associated with the item that are evaluated at corresponding ray directions associated with the three dimensional point.

* * * * *